United States Patent [19]
Kelly

[11] Patent Number: 6,129,093
[45] Date of Patent: Oct. 10, 2000

[54] METHOD OF REMOVING FROZEN MATERIAL FROM A WIPER

[76] Inventor: Michael J. Kelly, 713 Morewood Crescent, Orleans, On., Canada, K4A 2P9

[21] Appl. No.: 09/137,129

[22] Filed: Aug. 20, 1998

Related U.S. Application Data

[63] Continuation-in-part of application No. 08/795,540, Feb. 6, 1997, Pat. No. 5,867,858, which is a continuation-in-part of application No. 08/594,867, Jan. 13, 1996, abandoned.

[51] Int. Cl.[7] .................................. B60S 1/32; B08B 7/02
[52] U.S. Cl. ...................... 134/6; 15/250.19; 15/250.351
[58] Field of Search ........................ 15/250.19, 250.351, 15/250.203, 250.202, 250.001, 250.352; 134/6

[56] References Cited

U.S. PATENT DOCUMENTS

| | | |
|---|---|---|
| 2,717,408 | 9/1955 | Page . |
| 2,784,438 | 3/1957 | Petersen . |
| 2,979,750 | 4/1961 | Anderson . |
| 5,070,571 | 12/1991 | Arai . |
| 5,129,123 | 7/1992 | Shirato . |
| 5,469,595 | 11/1995 | Dara . |
| 5,487,204 | 1/1996 | Nelson . |
| 5,551,116 | 9/1996 | DeKelaita . |
| 5,571,221 | 11/1996 | Kuo . |
| 5,636,407 | 6/1997 | Len . |
| 5,867,858 | 2/1999 | Kelly .................................. 15/250.19 |

FOREIGN PATENT DOCUMENTS

| | | |
|---|---|---|
| 334651 | 9/1989 | European Pat. Off. . |
| 812744 | 12/1997 | European Pat. Off. . |
| 1910590 | 8/1970 | Germany . |
| 3731921 | 12/1988 | Germany . |
| 4-85150 | 3/1992 | Japan . |

*Primary Examiner*—Gary K. Graham
*Attorney, Agent, or Firm*—R. J. Austin

[57] ABSTRACT

Various embodiments of a wiper assembly are disclosed which facilitate the removal by complete release or shattering of a frozen mass of ice or snow which has become merely trapped beneath a wiper blade during its movement. In particular, there is described a method and structures for removing such frozen masses by vibrating a wiper blade at high intensity of vibration. The vibrational intensity is normally measured when no frozen masses are present and causes at least parts of the wiper blade to move out of contact with the windshield.

13 Claims, 20 Drawing Sheets

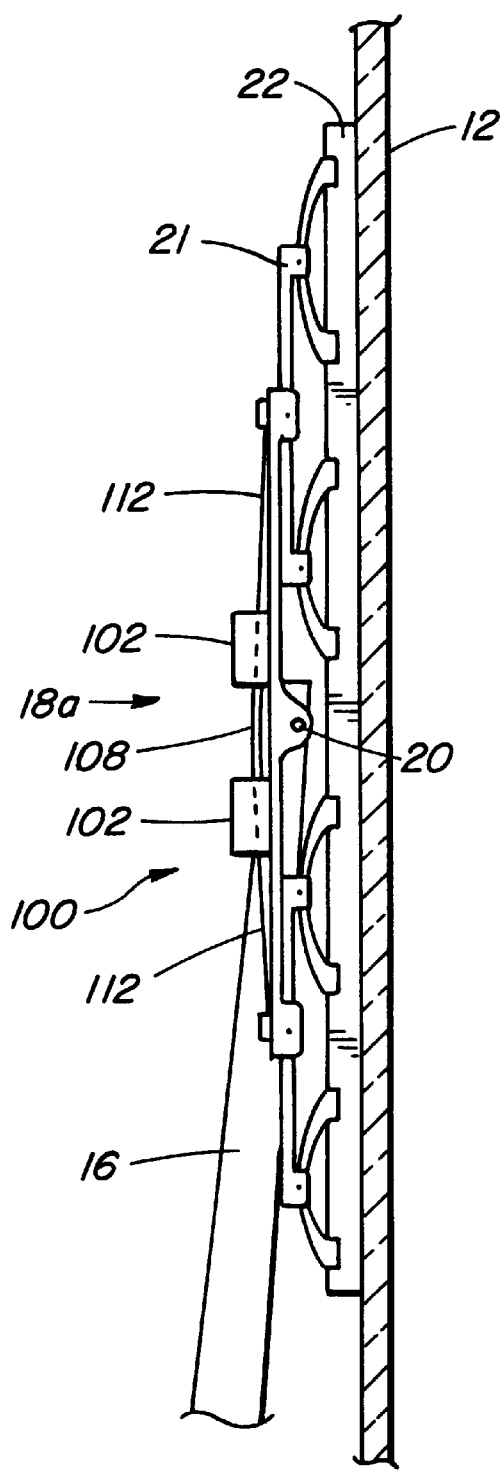
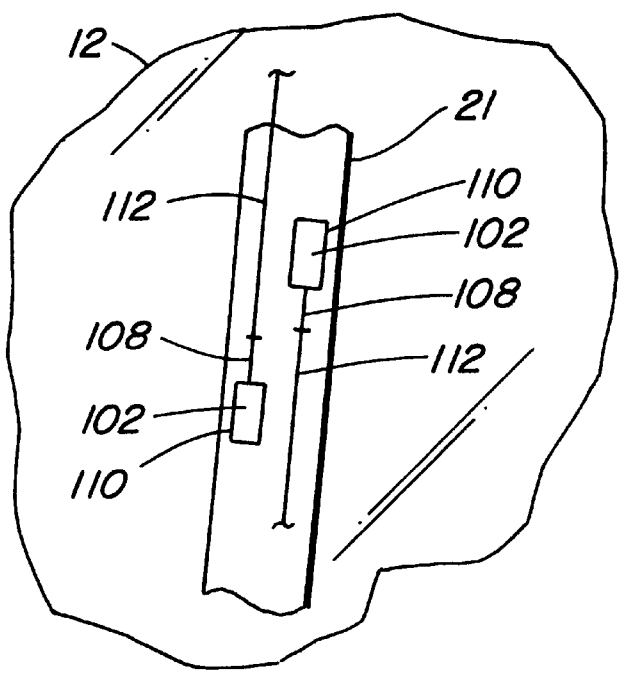
FIG. 18
FIG. 18a

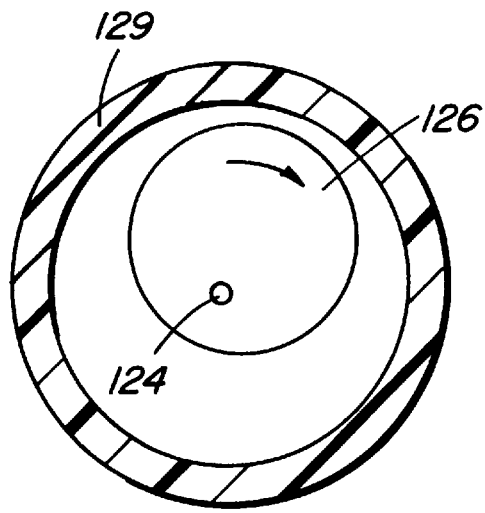
FIG. 20c
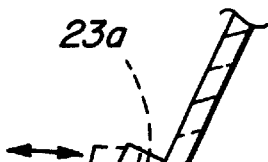
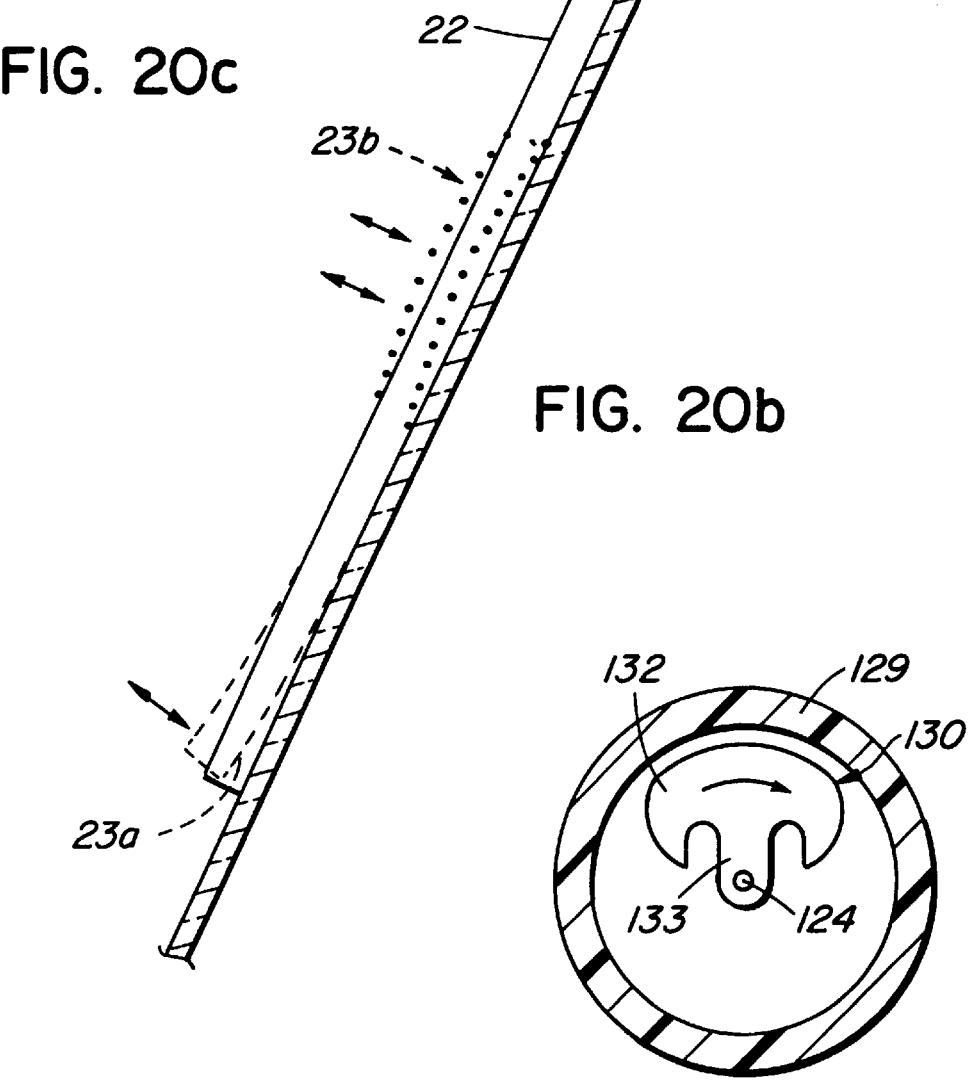
FIG. 20b
FIG. 21

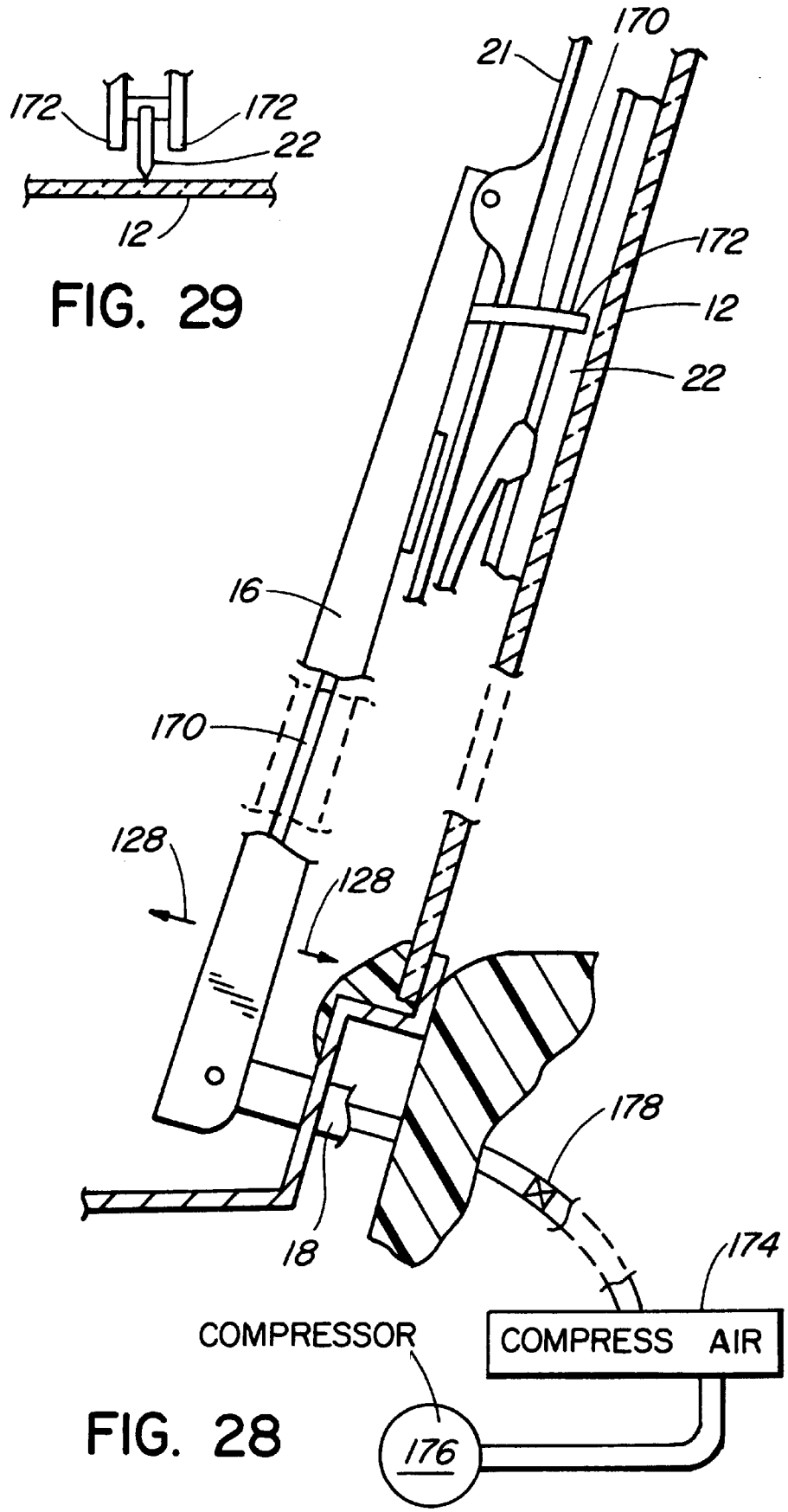

METHOD OF REMOVING FROZEN MATERIAL FROM A WIPER

This invention relates to wiper assemblies and this application is a continuation in part of application Ser. No. 08/795,540, filed Feb. 6, 1997, now U.S. Pat. No. 5,867,858, which is a continuation in part of application Ser. No. 08/594,867 filed Jan. 31, 1996, now abandoned.

FIELD OF THE INVENTION

Background

Virtually all vehicles today (cars, trucks, trains, airplanes, boats etc) incorporate one or more windshield wipers which can be deactivated at any time by a driver to sweep repeatedly across an exterior surface of the windshield. A rubber or plastic wiper blade of each wiper assembly engages the exterior surface to clear debris from that portion of the windshield generally in front of the driver to maintain unimpaired visibility. Debris left to build up on the windshield impairs visibility for the driver and if permitted to build up anywhere on the wiper assembly can also reduce wiping efficiency. Maintaining good visibility for the driver lessens the chances of the vehicle becoming involved in an accident and hence increases the safety level for all occupants.

The type of debris which can accumulate depends on the geographical location and season. In particular, in parts of the world where winter weather is severe, snow and ice build up on wiper blades is a common experience. In particularly extreme weather conditions, it is not uncommon for snow or ice to freeze to a windshield wiper arm and/or wiper blade. While allowing for movement of the blade across the windshield, such frozen debris may seriously reduce the cleaning action of the blade on the windshield surface. Such freezing may occur while a vehicle is being driven or when stationary. Also, it is common for lumps of ice or snow to become merely trapped under a wiper blade during use so as to be carried with the blade on its wiping movement. This situation may occur if the blade in moving across the windshield surface is caused to ride onto a frozen mass, i.e. of ice or snow, and move it from a stationary location upon the windshield. The trapped frozen mass is thus not frozen either to the windshield or to the wiper blade assembly.

As long as the frozen mass remains merely trapped, the efficiency of the wiper blade is severely reduced as a significant portion or all of the wiper blade can no longer engage the exterior surface of the windshield. The thickness of this frozen mass may have a bearing on the wiping efficiency especially if the mass extends along a significant length of the blade. Ice lumps as small as one millimeter if so trapped can cause the wiper to experience reduced efficiency. Snow and/or ice formation anywhere on the windshield wiper assembly may contribute to reducing wiping efficiency also by raising sections of the blade off the windshield.

A driver of a vehicle when experiencing any of the problems discussed above generally has two options. The first and safest option is to stop the vehicle and, even in extremely cold conditions, exit the vehicle to manually break away the ice or snow frozen to or trapped beneath the wiper blade. This is not always convenient and is certainly not possible for pilots and train operators. Even when driving a road vehicle there are times when stopping to remove debris from a windshield is impossible due to inherent danger. For instance, bridges or certain roadways have little or no shoulder area and when busy with traffic, a driver may not stop safely. Even when there is room to stop by the roadside, it may not be prudent to do so as personal safety may be at risk if the driver leaves the vehicle or if his parked position may present a driving hazard to other vehicles.

A common although unrecommended solution for many drivers is to open a window and manually attempt to grasp a windshield wiper as it travels within extended reach of the driver. In reaching the wiper, the driver attempts to lift it momentarily from the windshield in the hope that the debris will become dislodged. Needless to say this is an extremely unsafe practice and, in many cases, such as for larger vehicles, e.g. trains and airplanes, is simply not an option.

A further problem concerns the coating of a windshield wiper assembly with ice or snow when the wiper assembly is in the parked position during storm conditions. The thickness of the ice or snow may be such as to trap the wiper assembly in the parked position and thus prevent its operation when the operating motor is energized. It can be an extremely tedious and unpleasant operation for a driver to need to free the wiper manually from the parked position in winter conditions. To ease this problem, some car manufacturers incorporate heating elements in windshield glass. The elements function to heat windshields in a manner similar to that of present day electrical rear window defrosters. This solution is not only expensive and extremely slow in effective operation, it cannot dislodge or melt ice or snow while the wiper assembly is in operation. Furthermore, windshield heating elements are ineffective in releasing wipers from ice or snow when in their parked positions if the wiper blades are not in engagement with the windshields.

Other solutions, such as in U.S. Pat. No. 5,325,561 issued to Kotlar, teach electrically heating various portions of a wiper blade to melt away snow and ice. Although this solution is somewhat effective when the wipers are in operation, it is an extremely slow operation. This solution can also be very expensive for the owner of the vehicle as wiper blades wear away and should be replaced regularly. Wiper blades of the type taught in the above patent would incorporate an integral electrical heating element thereby drastically increasing the cost of replacement blades.

In addition, headlights on some cars incorporate a small wiper arrangement to clean the exterior glass surfaces of the headlights. Headlight wipers may suffer severe ice buildup in winter climates and very often cannot be operated as they become frozen in position. Their proximity to the ground and front end location places them directly in the path of snow, slush and ice raised by passing vehicles or vehicles in front.

SUMMARY OF INVENTION

The invention seeks to provide a combination of wiper assembly and light transmitting screen member and a method of using a wiper blade which seek to minimize the above problems.

According to the present invention, there is provided a combination of a wiper assembly and a light transmitting screen member having a surface to be cleaned comprising a wiper arm for holding a wiper blade, the wiper arm driveable upon a mounting to carry the wiper blade across the surface to be cleaned with a surface engaging pressure; and first urging means for urging the wiper arm towards the surface to be cleaned so as normally to hold the wiper blade against the surface with the surface engaging pressure, and second urging means actuable for urging the wiper arm away from the surface to be cleaned and against the first urging means so as to lessen the surface engaging pressure in order to dislodge debris, the first urging means returning the wiper arm towards the surface when the second urging means is deactivated.

In the above combination according to the invention, the light transmitting screen member is considered to include vehicle windshields such as cars, trucks and buses. It is also considered to include a window of an aircraft, ship or train, a protective glass of a headlight and the glass surface found on a side mirror of a truck. Any type of transport may thus benefit from the invention i.e. land, sea or air vehicles.

The first urging means is normally in the form of a tension spring which applies the wiper blade to the light transmitting screen member with a small force, perhaps to the order of 12 pounds or less and which needs to be overcome by the second urging means.

The inventive combination, dependent upon design, is capable of dislodging or shattering ice or snow debris frozen to or trapped between the wiper blade and against the light transmitting screen member. The second means may be electrically powered, e.g. it may comprise basically a solenoid actuator or an electric motor. Alternatively, the second urging means comprises a piston and cylinder arrangement which may be hydraulically or pneumatically powered, and this cylinder arrangement is used in place of the solenoid actuators or electric motors. The second urging means may act directly against the light transmitting screen member itself or cause the wiper blade to move outwardly upon its mounting by applying a force between the arm and the mounting. In one such arrangement, a solenoid actuator may be positioned between the mounting and the wiper arm.

According to a further aspect of the invention, the second urging means is replaced with a means actuable to flex an end portion of the wiper blade away from the surface to be cleaned.

According to yet a further inventive aspect, there is provided a method of applying vibration to the wiper blade. This vibration, to be effective in the removal of a frozen mass of ice or snow, must be of such intensity that when no ice or snow is present upon the surface to be cleaned, parts at least of the wiper blade are caused to move repeatedly into and out of contact with that surface. When a frozen mass is present upon the surface, the effect of vibration at the intensity referred to above, in removal of the frozen mass, is dependent upon certain conditions. In situations where a frozen mass is merely trapped between the wiper blade and the surface to be cleaned without adhering either to the blade or surface, the vibrational intensity is such that parts at least of the wiper blade move repeatedly out of and into contact with the frozen mass. This has the effect of causing removal of the frozen mass either by releasing the frozen mass in one piece or by shattering the frozen mass into smaller pieces under the force of vibrational impact, the pieces then being dispersed. In another situation where a frozen mass is adhered either to the wiper blade or to the surface to be cleaned, but not both, then vibrational impact is effective in certain cases, in shattering the frozen mass to allow for its dispersion. In yet a further situation, where a frozen mass is adhered both to the wiper blade and to the surface to be cleaned, the vibrational intensity may cause the wiper blade alternately to reduce and increase pressure upon the mass until the wiper blade becomes free. Vibration will then repeatedly force the wiper blade away from and into impact contact with the frozen mass and may then be effective in shattering the mass.

From the above, the method according to the latter aspect of the invention is concerned with improving the transmission of light through a light transmitting screen member having a frozen mass trapped between the screen member and a wiper blade moveable across the screen member comprising, over a desired time period, alternately reducing and then increasing wiper blade pressure upon the frozen mass by continuously vibrating the wiper blade against the frozen mass and then effecting removal of the frozen mass from between the surface and the wiper blade under the vibrational intensity.

DESCRIPTION OF PREFERRED EMBODIMENTS

Embodiments of the invention will now be described, by way of example, with reference to the accompanying drawings, in which:

FIG. 18 is a wiper assembly according to a fifth embodiment and showing a wiper blade held closely against a windshield;

FIG. 18a is a view in the direction of arrow 18a in FIG. 18;

FIG. 20b is a view in the same direction as FIG. 20 to show flexing of the wiper blade in use of the sixth embodimentl;

FIG. 20c is a cross-sectional view taken along line 20c—20c in FIG. 20 and to a larger scale;

FIG. 21 is a view similar to FIG. 20c of a modification of the sixth embodiment;

FIG. 28 is a side elevational view of a wiper assembly according to a thirteenth embodiment; and FIG. 29 is a cross-sectional view through a windshield and showing an end view of part of the wiper assembly of the thirteenth embodiment.

Figure 1:
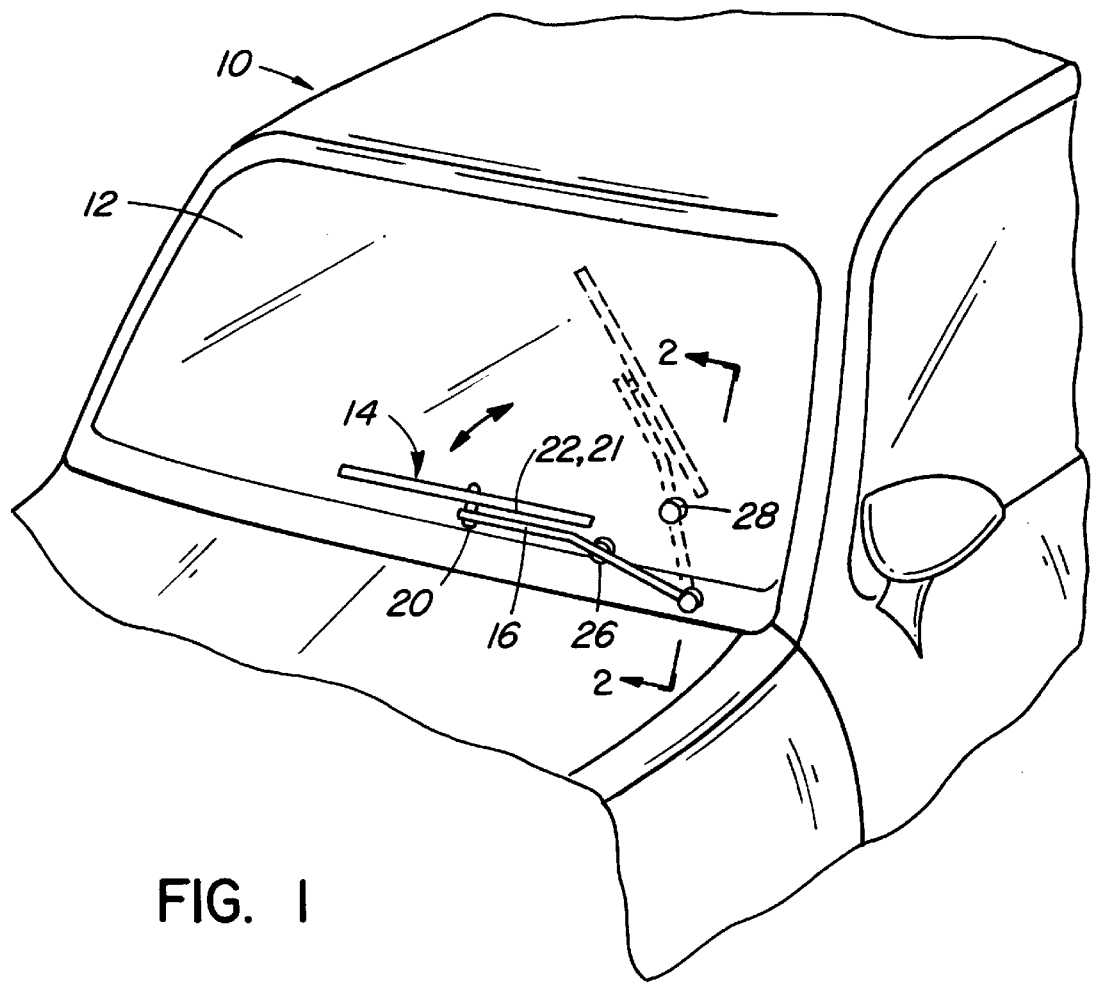
FIG. 1 is an isometric front elevational view of part of a vehicle and incorporating a wiper assembly according to a first embodiment.

As shown in FIG. 1, a vehicle has a body 10 with a windshield 12 and has attached thereto a windshield wiper assembly 14 according to a first embodiment. As will be seen from FIG. 1, only one windshield wiper assembly is shown. This is for convenience only and it should be understood that as with other and more conventional vehicles two windshield wipers are actually used, i.e. one for each of the left and right sides of the windshield. As shown by FIG. 1, and more particularly by FIG. 3, the wiper assembly 14 is conventional in that it has a wiper arm 16 pivotally attached at one end to a short oscillatable shaft 18 which extends through a part of the body (FIG. 2) directly beneath the windshield 12. In known manner the arm 16 may be oscillated from side to side upon the outside surface of the windshield for the express purpose of cleaning the windshield during adverse weather conditions. Also, conventionally, the wiper arm 16 carries, about a mounting pin 20, a wiper blade superstructure 21 holding a wiper blade 22 which engages the windshield with a surface engaging pressure to perform a cleaning operation. To provide the surface engaging pressure, means is provided for urging the wiper arm towards the windshield. The urging means comprises in the embodiment, a tension spring 24 (FIG. 4) which extends partly along the length of the arm 16 from the shaft 18. The action is such that any manual effort to raise the arm 16 away from the windshield is resisted by the tension spring 24 which upon the arm being released, immediately forces the blade 22 to return into its normal position in engagement with the surface of the windshield.

The invention differs from conventional constructions and as illustrated, for instance, by the first embodiment, in that an urging means is also provided to move the arm 16 in a direction away from the windshield and against the influence of the spring 24. This latter urging means is operable to at least lessen the surface engaging pressure of the blade 22 upon the windshield and preferably, as in the embodiment, to move the blade 22 completely away from the windshield for a specific time period. Lessening of the surface engaging pressure is intended to decrease any grip that the blade may have upon any debris in the form of frozen masses of ice or snow which have become merely trapped under the wiper blade 22 and are being carried with the blade on its wiping movement across the windshield. Such masses, which are not frozen either to the windshield or to the wiper blade, if remaining in place seriously impede contact of the blade upon the windshield and, as a result, seriously reduce the cleaning action of the blade. Lessening of the surface engaging pressure may permit such frozen masses to fall from between the blade and the windshield. Preferably, however, the movement away from the windshield is complete such that debris being carried on its oscillating movement by the blade 22 is released thereby clearing the windshield of the debris.

Figure 3:
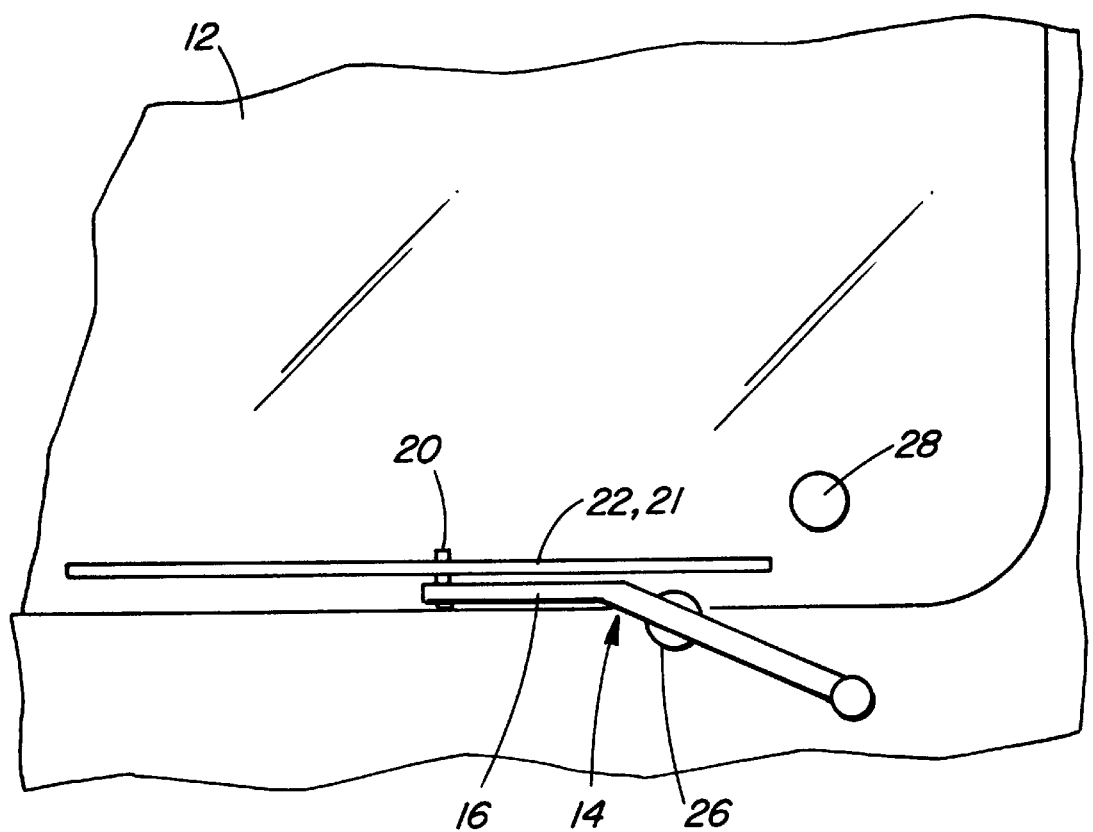
FIG. 3 is a front elevational view of the windshield of the vehicle in FIG. 1 and to a larger scale to show greater detail.
Figure 4:
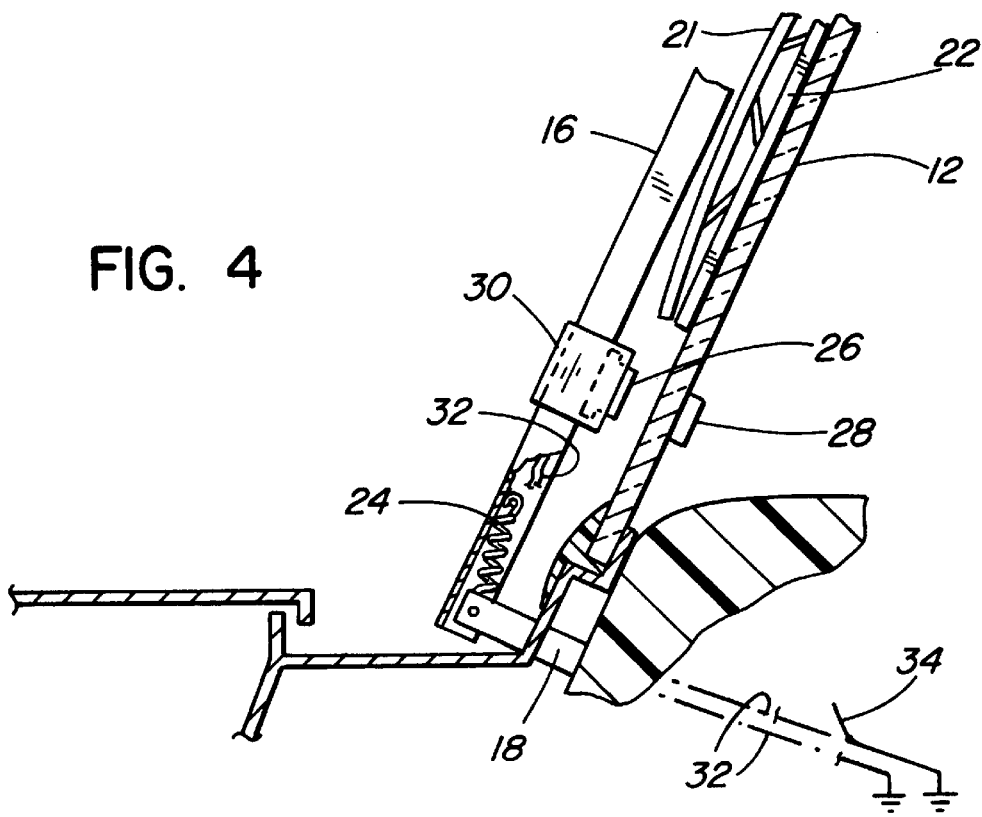
FIG. 4 is a view similar to FIG. 2 and to a larger scale to show the wiper assembly in a first position during use.
Figure 5:
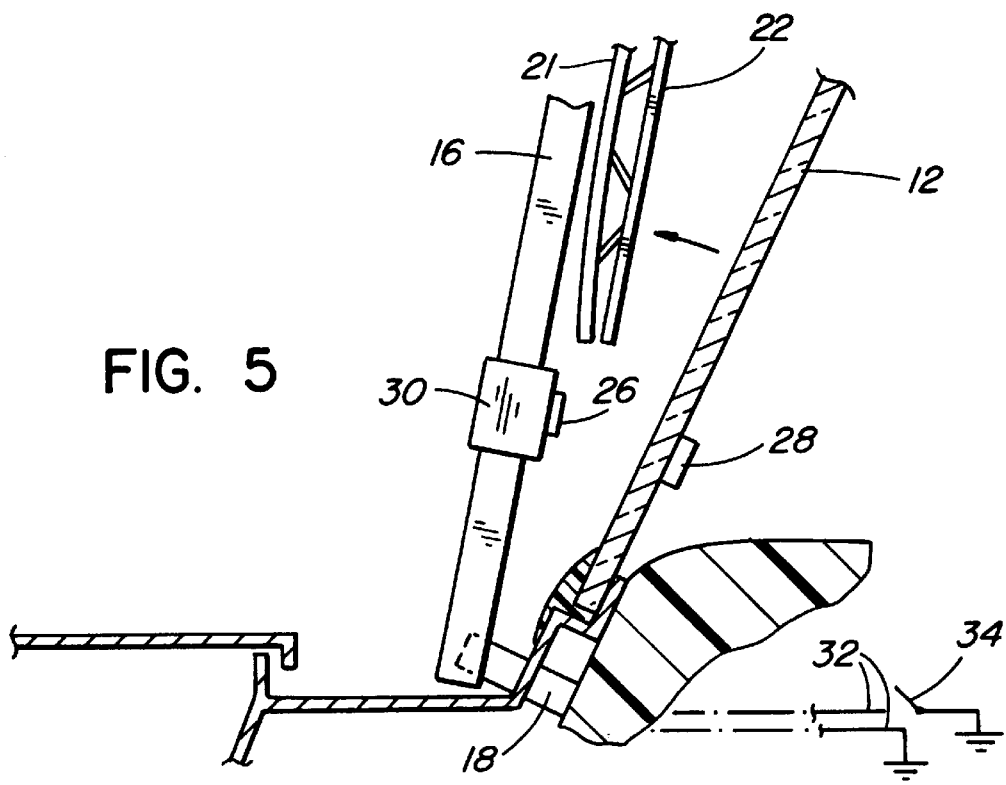
FIG. 5 is a view similar to FIG. 4 and showing the wiper assembly in a second position in use.

In this embodiment the means for urging the wiper arm away from the windshield comprises an electrically powered means in the form of two magnets 26 and 28 (FIGS. 3, 4 and 5). The magnet 26 is securely mounted upon the arm 16 at a position towards its pivoted end and out of the line of swept area of the wiper blade 22. However the magnet 26 could also be disposed further along the arm so as to lie within the swept area. The magnet 26 is mounted on the arm 16 so as to be directed towards the windshield 12, as shown particularly in FIG. 4, and is held in place in the embodiment by a holding means which may be in the form of a strap 30 extending around the arm 16 so as to hold the magnet 26 against the arm and with the magnet projecting through an orifice in the strap towards the windshield. The other magnet 28 is mounted by epoxy, for example, on the inside surface of the windshield in a position such that during oscillation of the wiper arm 16 across the windshield, the magnet 26 passes directly over the magnet 28.

One of the magnets 26 and 28 is an electromagnet, although both may be electromagnets. In the embodiment the magnet 28 is a permanent magnet and the magnet 26 is an electromagnet and is energized by wires 32 extending down the arm and forming part of the circuitry of the vehicle, the wires connected to a manually operable switch 34. Upon energization of the magnet 26, a repelling force is generated between the two magnets when the magnets 26, 28 are directly over one another such that the repelling force acts against the wiper arm 16 to move it away from the windshield. The spring 24 offers only light force to move the arm 16 against the windshield i.e. to the order of a few pounds only. The repelling force of the two magnets 26 and 28 may be made sufficient to move the arm 16 so that the wiper blade 22 is forced to lose contact with the windshield.

Figure 2:
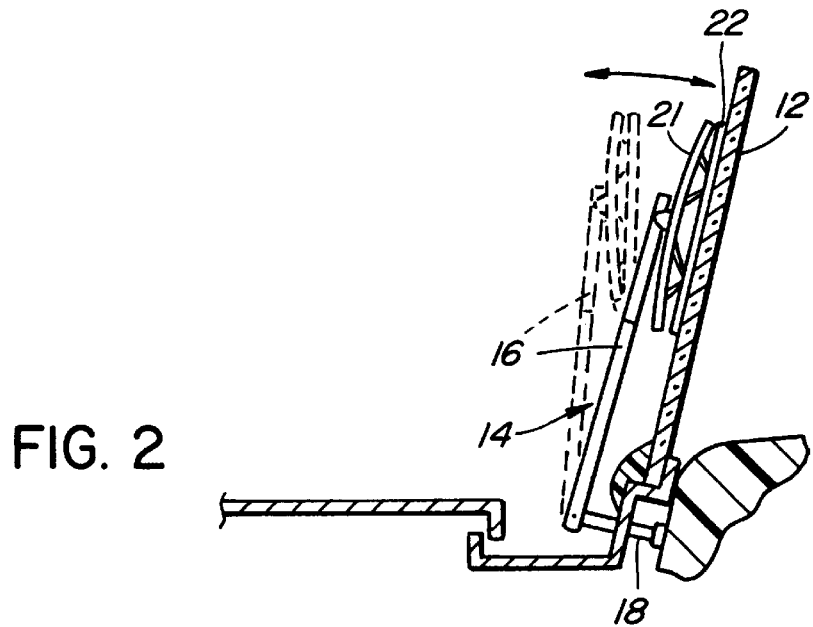
FIG. 2 is a cross-sectional view taken along line 2—2 in FIG. 1 of part of the vehicle and showing the wiper assembly in side elevation.

In use, the wiper arm 16 is actuated in conventional manner to perform its oscillating movement so that the blade may clean the windshield in normal fashion. However, when debris, such as a frozen mass, is caught between the blade and the windshield and carried by the blade across the windshield, the oscillating movement of the blade will not release such debris. Hence, as shown by FIG. 2, the arm 16 is moving across the windshield in the full outline position with the blade normally in contact with the windshield. Should debris be required to be removed from beneath the wiper blade 22 then the magnet 26 is energized by the driver from within the vehicle. As soon as the magnet 26 passes directly over the magnet 28 a repelling force is generated thereby forcing the arm 16 and blade 22 into the chaindotted position (FIG. 2) until the magnet 26 has passed beyond the magnet 28 at which point the arm 16 returns to its full outline position. As may be seen, and as is more clearly shown in FIGS. 4 and 5, the movement to the chaindotted position in FIG. 2 and as represented in greater detail by FIG. 5, provides sufficient gap between the blade 22 and the windshield to enable the debris either to fall away from or be blown away from the blade 22 thereby clearing the windshield of obstruction. For debris which refuses to fall away from, or be blown away from under the blade 22, the wiper blade, while in the raised chaindotted position (FIG. 2) will usually travel over and beyond the debris before returning to its normal position. This action generally results in the debris being cleared from the windshield on the next or subsequent pass of the wiper blade as the blade along its complete length is then engaging the windshield. In addition to this, when the blade 22 returns to the windshield, (full outlined position in FIG. 2 and as shown in FIG. 4), it may return with sufficient force as to shatter accumulations of ice or snow which are frozen on the wiper assembly itself. This shattering action will of course depend upon the hardness and concentration of the ice or snow and upon the impact force.

As may be seen, therefore, the magnets 26 and 28 are operable to clear masses or accumulations of ice and snow which are either frozen to the wiper assembly or are carried by the wiper blade across the windshield surface. Movement of the wiper blade away from the windshield has a secondary advantage in that it allows other materials, e.g. leaves or paper, to fall from the windshield. Preferably, an electronic switch means is provided (not shown) to activate the electromagnet 26 which only requires a single momentary action by the user. The electronic switch means would include an electronic holding circuit capable of keeping the electromagnet 26 energized for a sufficient period of time to guarantee the required positioning of the magnets 26, 28 to generate the repelling force, regardless of where in the wiper travel the switch is activated.

Figure 6:
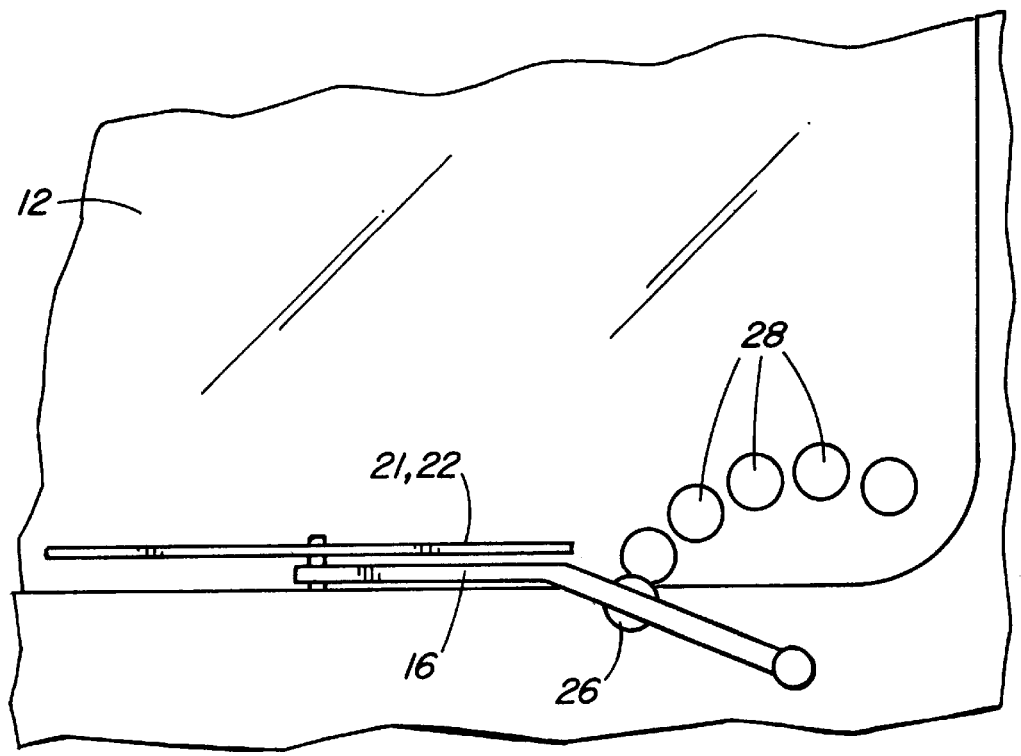
FIG. 6 is a view similar to FIG. 3 and shows a modification of the first embodiment.

In a modification of the first embodiment as shown by FIG. 6, a plurality of permanent magnets 28 are provided on the inside surface of the windshield. These magnets are positioned in spaced locations around an arc which is to be swept by the electromagnet 26. In use of the modification shown in FIG. 6, with the electromagnet 26 energized, the blade 22 is held away from the windshield for an extended period, i.e. over the full length of the sweep of the blade across the windshield. This provides longer periods of time than is possible in the use of the first embodiment, for enabling masses of ice or snow to be removed from beneath the wiper blade, or from frozen adherence to the wiper assembly.

In an alternative circuitry arrangement for the modification of FIG. 6, one or all of the magnets 28 are also electromagnets. This structure enables the blade 16 to be moved outwards from the windshield at any chosen location during its sweep dependent upon which of the electromagnets 28 is energized for this purpose.

In further embodiments now to be described, features of similar construction to those described in the first embodiment will be referred to by use of the same reference numbers as in the first embodiment without further discussion.

Figure 7:
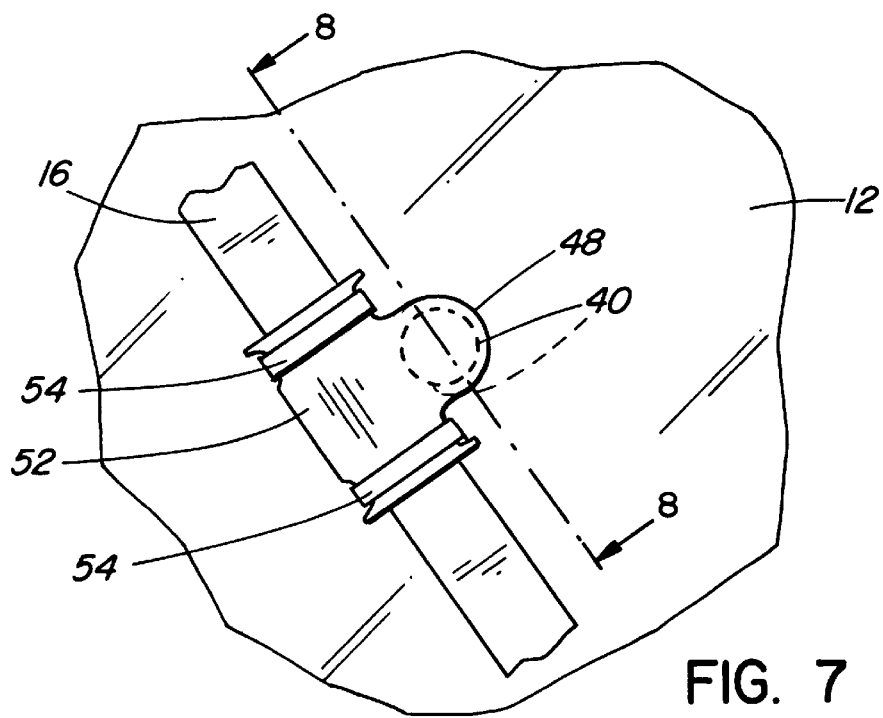
FIG. 7 is a front elevational view of part of a wiper assembly according to a second embodiment.
Figure 8:
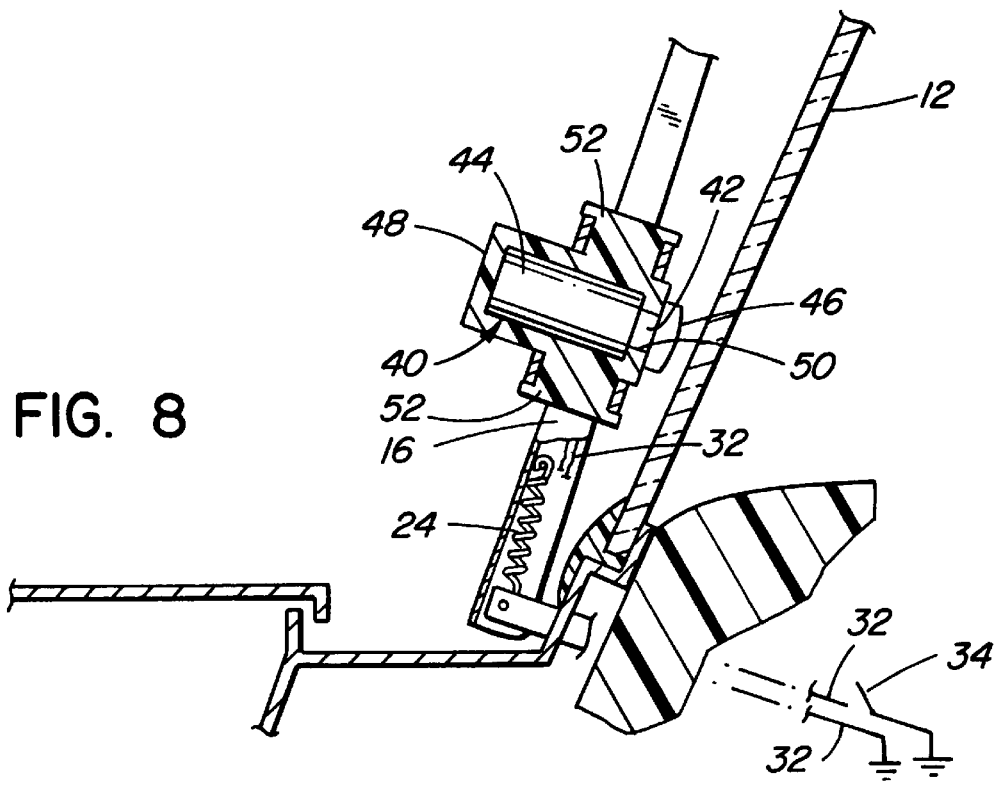
FIG. 8 is a cross-sectional view taken along line 8—8 in FIG. 7 and showing the wiper assembly of the second embodiment in one position upon a windshield of a vehicle.
Figure 9:
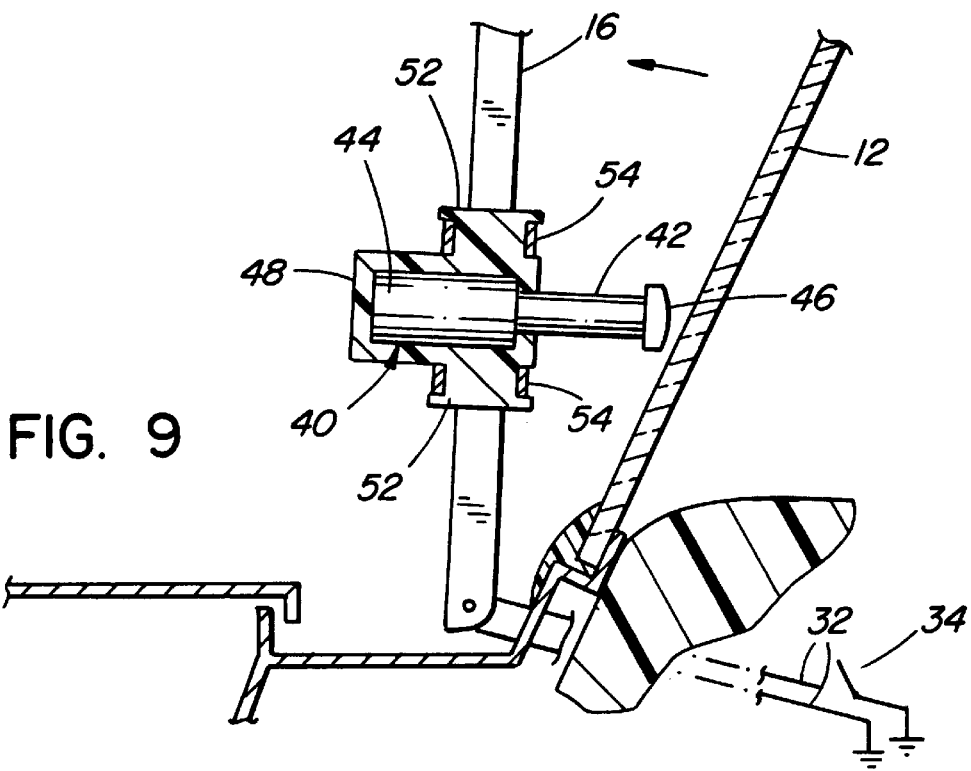
FIG. 9 is a view similar to FIG. 8 showing the wiper assembly of the second embodiment in another position relative to the windshield.

In a second embodiment as shown in FIGS. 7, 8 and 9, the means for urging the wiper arm and thus the blade away from the windshield 12 is again an electrically powered means and comprises a solenoid actuator 40 having an axially moveable plunger core 42 within a cylindrical housing 44. Means are provided for mounting the solenoid actuator upon the wiper arm 16 with the plunger core 42 having an operative end 46 extending from the solenoid housing 44 and towards the windshield 12. The means for securing the solenoid actuator to the arm comprises a protective rubber or plastic molded surround 48 which is shaped intimately around the cylinder 44 and extends inwardly of the cylinder adjacent the end 46 of the solenoid to surround the plunger core 42 of the solenoid while allowing for its sliding axial movement. The surround 48 has a mounting portion 52 by which it is mounted to the wiper arm 16 as shown in FIGS. 7 to 9. This mounting portion (which extends in a direction normal to the axis of the solenoid actuator) may be cylindrical in molded form so as to be received upon the arm 16 by its sliding reception down the arm. Alternatively (not shown) the mounting portion 52 may be split along its length to be wrapped around the arm 16. In either case, the surround 48 is secured in position by a holding means comprising two metal clamps 54 surrounding two end portions of the mounting portion 52 and tightened to grip the mounting portion upon the arm 16. Alternatively, other holding means may be provided such as resilient clips which are sprung resiliently into position around the mounting portion 52. As a result, and as shown particularly by FIG. 7 when the solenoid actuator 40 is in position it is disposed towards one side of the wiper arm 16.

In use of the second embodiment, the wiper arm 16 is moved in oscillatory fashion across the windshield as in the first embodiment while occupying a position relative to the windshield as shown in full outline in FIG. 2 and by FIG. 8, i.e. with the wiper arm in contact with the windshield with a surface engaging pressure. Should it be required to remove a frozen mass which is merely trapped, from beneath the wiper blade, it is only necessary to actuate the solenoid actuator which is connected to the circuitry of the vehicle by conductors 32 as in the first embodiment. Solenoid actuation by driver operation of the switch, results in the movement of the plunger core 42 outwardly and into contact with the windshield. As a result of this, the action of the spring 24 to hold the wiper arm in the position of FIG. 8 is overcome and the wiper arm is caused to move outwardly to the position of FIG. 9. This moves the wiper arm in a direction away from the windshield and positions the assembly somewhat as shown in the dotted position for the assembly in FIG. 2. Upon the frozen mass being released from beneath the wiper arm the solenoid actuator is de-energized by the driver to cause the wiper arm to return to its FIG. 8 position. Dependent upon the solenoid characteristics and its power relationship to the spring 24, it is possible that the wiper arm may return to the windshield at sufficient speed to create an impact load to break any ice or snow accumulation frozen to the wiper arm or wiper blade. The usefulness of the wiper assembly in this respect and in other embodiments, depends not only on the return speed and impact force of the wiper assembly as mentioned above but also on the accumulation, hardness and other characteristics of the snow or ice upon the wiper assembly. Depending on the speed with which the plunger core 42 moves outwardly and into contact with the windshield, a cushioning tip (not shown) placed over the operative end 46 may be required to prevent damage to the windshield.

Figure 10:
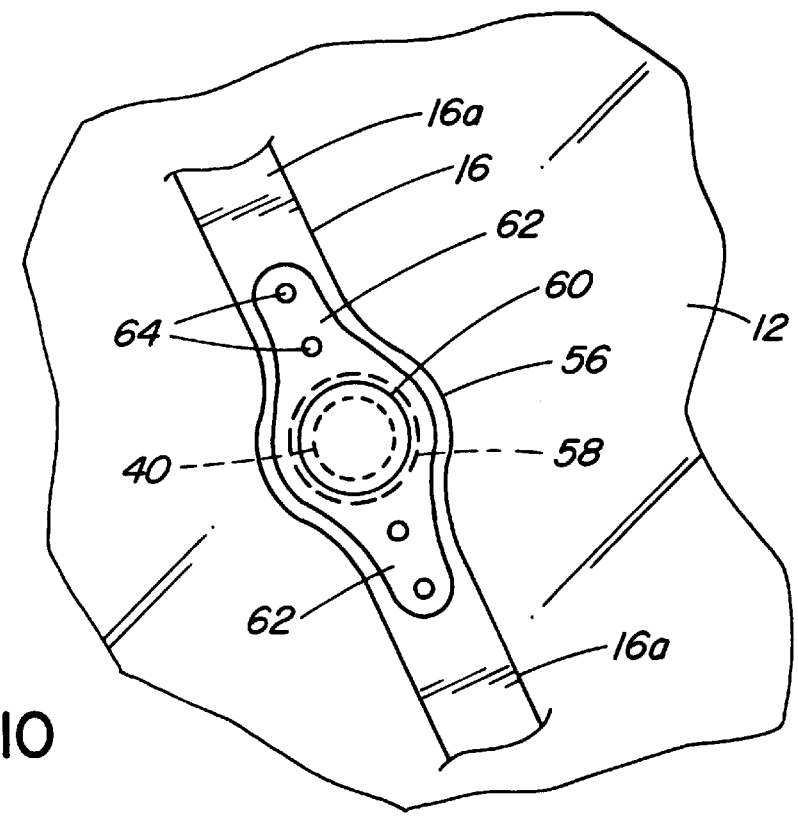
FIG. 10 is a view similar to FIG. 7 of a modification of the second embodiment.

In a modification of the second embodiment as shown by FIG. 10, a solenoid actuator 40 is mounted in a different manner upon the wiper arm. In this modified construction the wiper arm 16a is of slightly different construction from the arm 16 of previous embodiments in that it has a local widened area 56 provided with a central aperture 58 for receiving the solenoid actuator 40 through the aperture. The end 46 of the plunger core is directed towards the windshield as described in the second embodiment. The solenoid actuator is mounted within a molded plastic or rubber surround 60 which has integrally formed therewith a metal or hard plastic bracket 62 at one end. This bracket 62 is attached to the wiper arm 16a by rivets 64 although other holding means such as screws or nut and bolt assemblies may be used.

Figure 11:
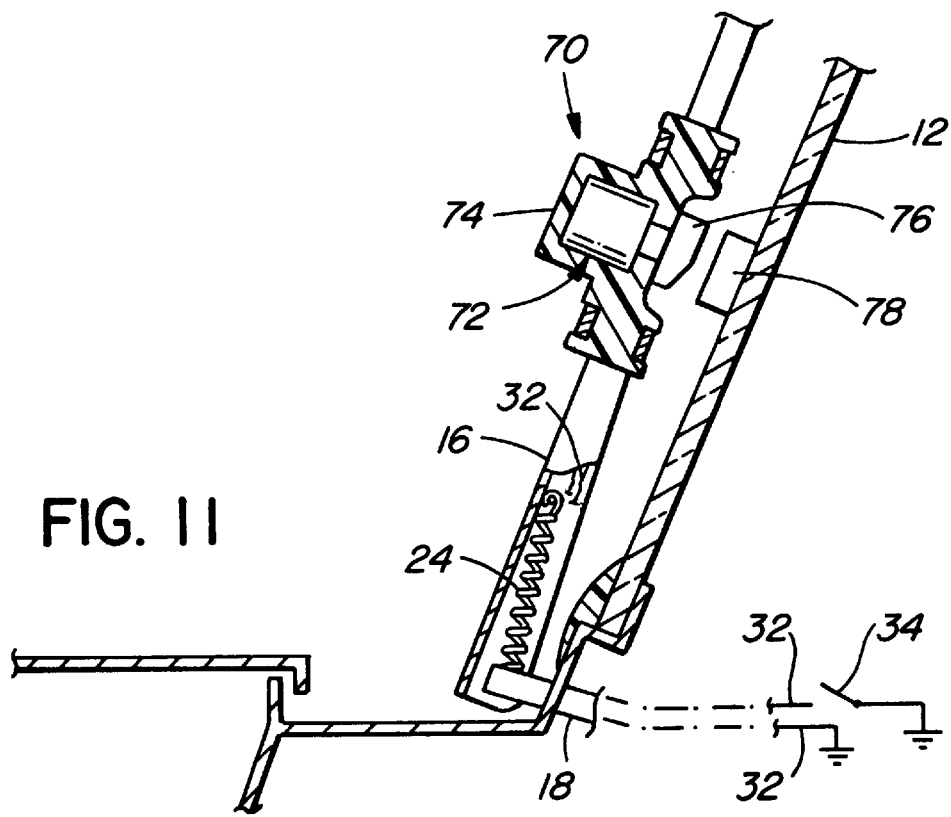
FIGS. 11 and 12 are views similar to FIGS. 8 and 9 of a third embodiment of the invention.
Figure 12:
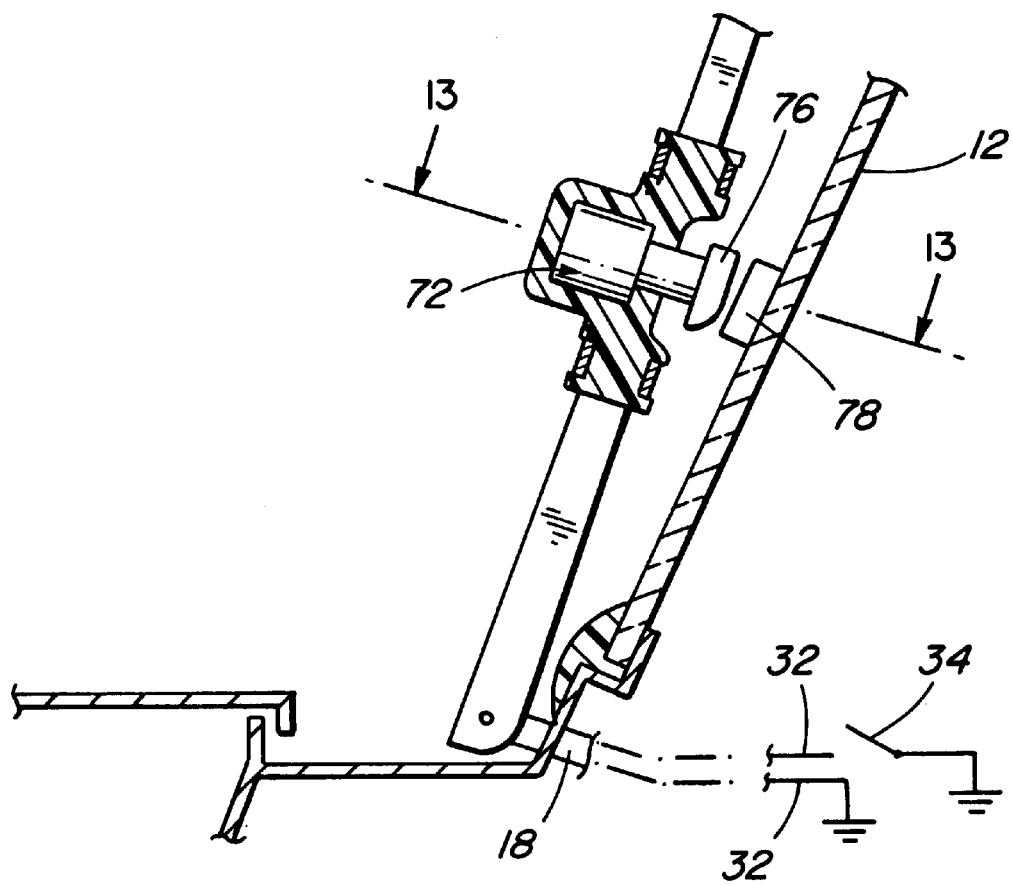
Figure 13:
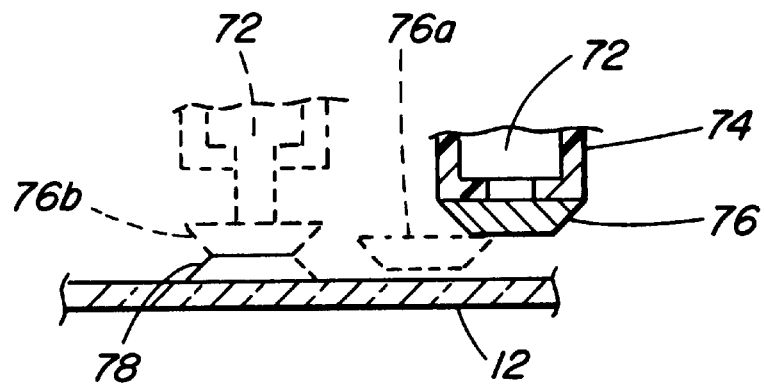
FIG. 13 is a cross-sectional view taken along line 13—13 in FIG. 12 of the third embodiment.

In a third embodiment as shown in FIGS. 11, 12 and 13, in a wiper assembly, a means 70 for urging the wiper arm away from the windshield comprises a solenoid actuator 72 mounted within a protective surround 74, the surround being mounted upon the wiper arm 16 in a manner similar to that of the second embodiment and also receiving the solenoid actuator in like manner. The solenoid actuator 72 has a projecting plunger core end 76 which faces towards the windshield 12. Positioned upon the windshield 12 is a rigid ramp 78 which is localized in position and disposed along the arc of movement of the plunger core end 76. In normal operation (FIG. 11 and full outline in FIG. 13) the plunger core end 76 is in a retracted position so that as the wiper arm oscillates over the windshield, the end 76 is spaced from the ramp 78 as it passes over it. However, should it be required to remove a frozen mass merely trapped beneath the wiper blade, then the solenoid is actuated by driver operation of the switch to force the end 76 outwards towards the windshield (chaindotted position 76a in FIG. 13). Upon the end 76 reaching the ramp, and as shown in the chaindotted position 76b in FIG. 13, the end 76 is caused to ride over the ramp thereby forcing the wiper arm into a position away from the windshield, e.g. as shown in FIG. 12 i.e. in the chaindotted position in FIG. 2, thereby enabling masses of ice or snow caught between the wiper arm and the windshield to be released. To cause the outward movement of the wiper arm, either the ramp 78, the plunger core 76 or each of them as shown in FIG. 13 has two inclined side surface regions to enable the plunger core end 76 to ride over the ramp while being directed outwardly. It is considered that each inclined surface may lie at a preferred angle of between 15 and 45 degrees to the plane of the windshield at the ramp position to achieve the desired result.

Figure 14:
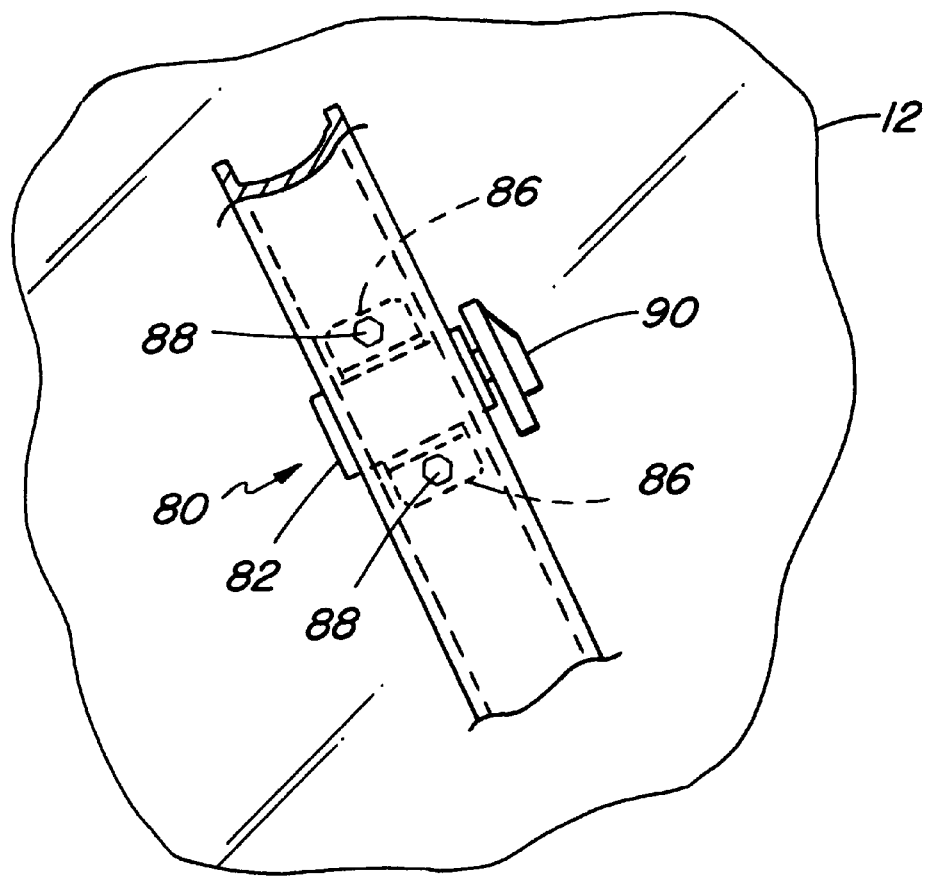
FIGS. 14, 15 and 16 represent a fourth embodiment and are views respectively similar to FIGS. 7, 8 and 9.
Figure 15:
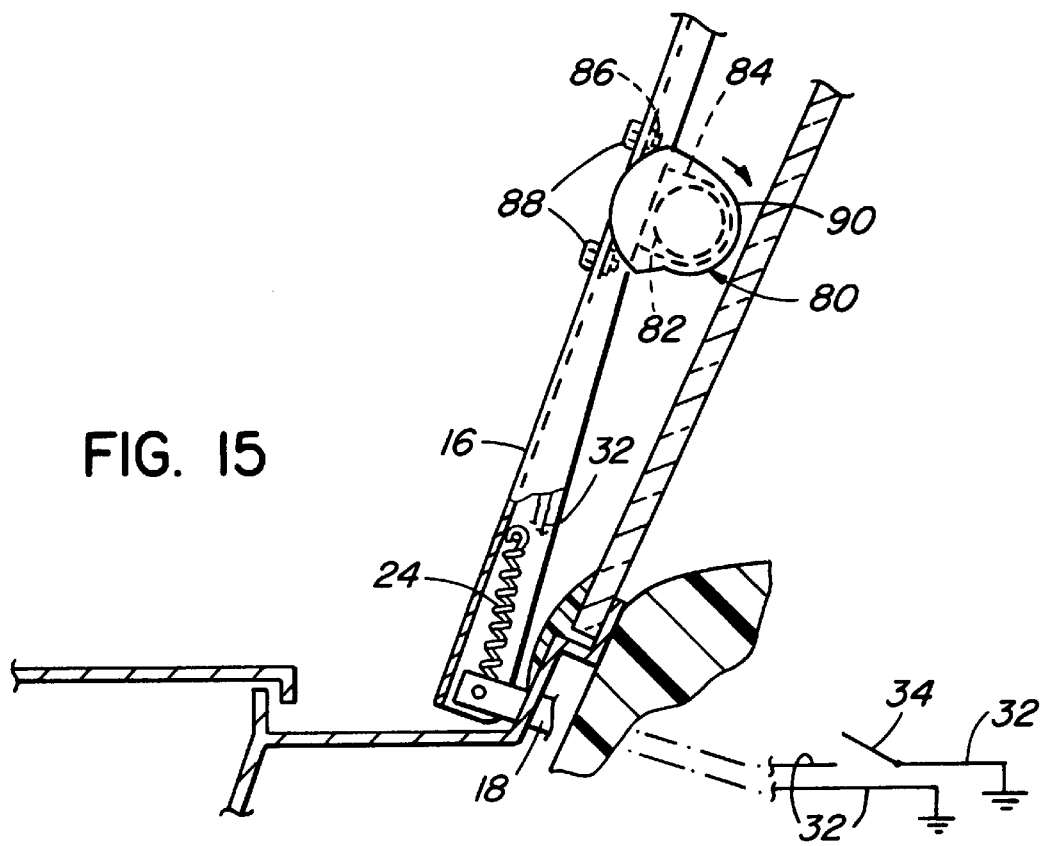
Figure 16:
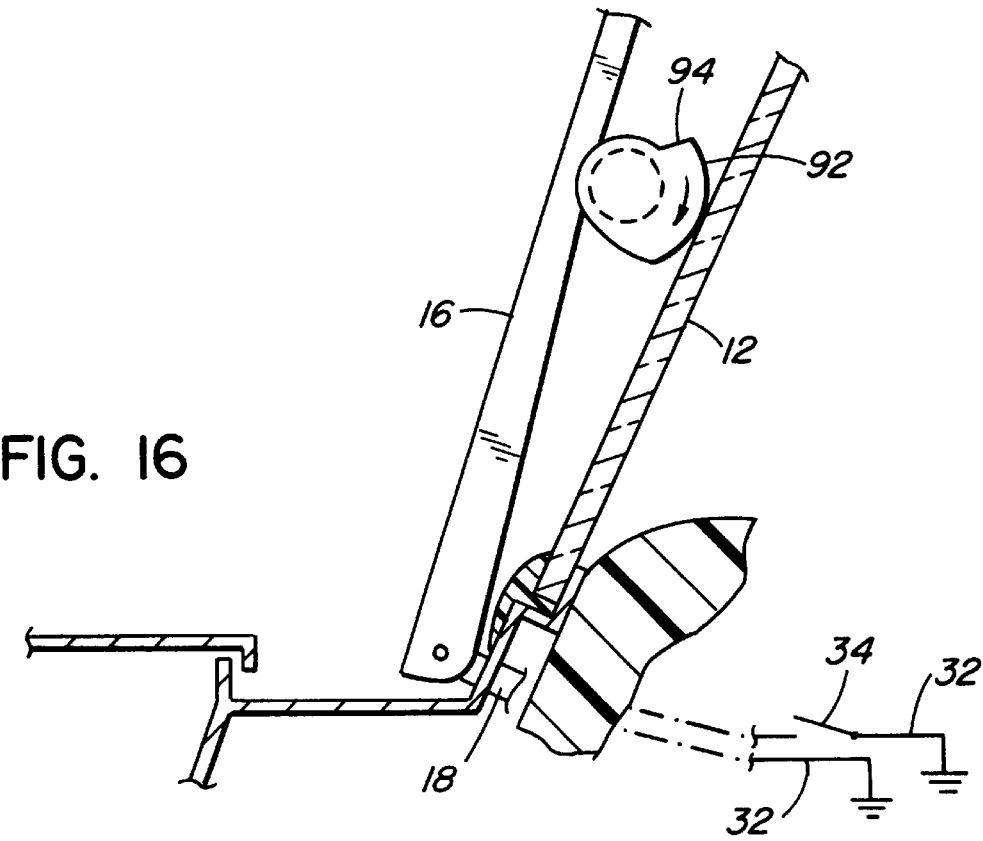

In a fourth embodiment as shown by FIGS. 14, 15 and 16, a means 80 for urging the wiper arm away from the windshield 12 comprises an electrically powered means having a DC motor 82 held in position between the wiper arm and the windshield by a U-shaped holding bracket 84 which extends around the housing of the motor and has two ends 86 which are attached to the underside of the wiper arm by srewthreaded means 88 or rivets as required. The motor 82 is disposed with its axis of rotation extending generally in the direction of oscillating movement of the wiper arm. The means 80 also includes an edge cam 90 which is secured to one end of the rotatable mass of the motor 82 and outwardly from the motor so as to be exposed. As will be seen from FIG. 15, the cam edge surface of the cam 90 is shaped so that with the arm 16 moving along its normal path, the cam is clear of the windshield 12. However, should it be required to remove ice or snow from beneath and moving with the wiper arm, then the motor 82 is energized by driver operation of the switch thereby rotating the cam 90 in the direction of the arrows in FIGS. 15 and 16. The edge profile of the cam is such that the cam rotates into engagement with the windshield 12 and has sufficient lift as illustrated by FIG. 16 to raise the arm 16 away from the windshield, e.g. as shown in chaindotted outline in FIG. 2, with the wiper blade removed from the windshield. As in previous embodiments, this action results in a frozen mass merely trapped by the wiper arm being permitted to fall or be blown away out of contact with the arm. It will be noticed that a lift portion 92 of the cam 90 ends abruptly at an inwardly extending edge face 94. Upon the cam moving past the position where the lift surface engages the windshield, the wiper arm is caused to return towards the windshield with an impact force under the influence of the spring 24. This may have the effect of shattering ice or snow which has settled and has frozen to the wiper assembly, and comments regarding the usefulness of this action for snow or ice removal are similar to those contained in the second embodiment.

It is interesting to note in the fourth embodiment that the motor 82 may be energized over any desired period of time. Thus the cam 90 will continue rotation during this time period and causes repeated cycles of movement of the arm away from the windshield. This action may be particularly useful for ice or snow removal and will take place progressively along the sweep of the arm over the windshield.

Figure 17:
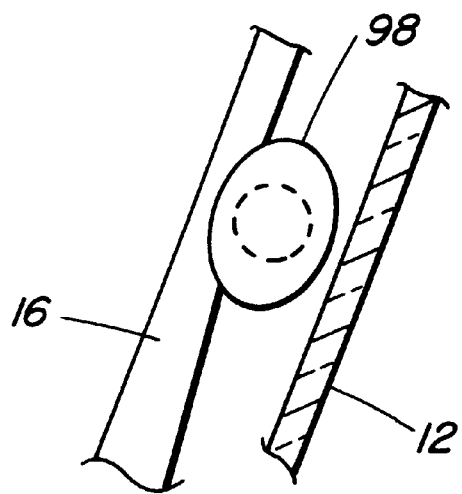
FIG. 17 is a view similar to FIG. 16 and showing only part of the windshield wiper assembly of a modification of the fourth embodiment.

In modifications of the fourth embodiment, a cam may have a different edge profile to provide a different result. For instance as shown in the modification by FIG. 17, a symmetrically arranged elliptical form of cam surface is provided upon a cam 98. This shape of cam will of course result in movement of the wiper arm 16 away from the windshield twice for each motor revolution.

The effectiveness of the impact force upon the windshield for ice and snow removal in the fourth embodiment and the modification thereof, depends upon the shape of the cam surface and also may depend upon the rotational speed of the motor.

Figure 19:
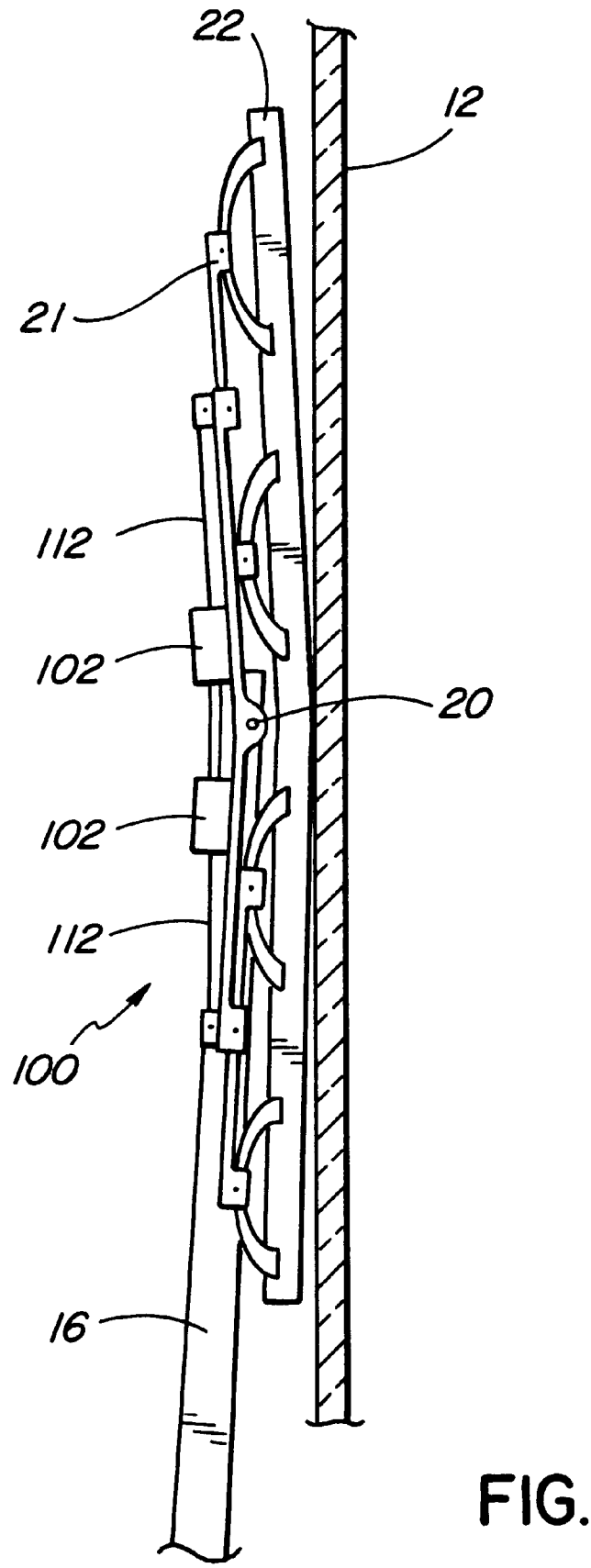
FIG. 19 is a view similar to FIG. 18 and showing the blade moved away from the windshield at both ends.

In a fifth embodiment as shown in FIGS. 18, 18a and 19, a wiper assembly has means 100 for urging an end portion of a wiper blade away from the windshield 12. The means 100 actually operates to move either end portion or both end portions of the wiper blade away from the windshield as desired dependent upon the position of location of debris under the wiper blade.

The means 100 comprises two solenoid actuators 102 secured to the superstructure 21 for the wiper blade, one solenoid actuator on each side of the mounting pin 20 of the superstructure to the wiper arm 16. The solenoid actuators face in opposite directions along the wiper arm carrier 104, (see FIG. 18a particularly) with each solenoid actuator having a plunger core with an end 108 projecting from the cylindrical housing 110 of the actuator 102 towards the closer end of the superstructure 21 for the wiper blade. Each of the plunger core ends 108 is connected by a rigid link 112 to the closer free end region of the superstructure 21, the link 112 having a pivotal connection at each end. Upon energization of each of the actuators 102, the associated plunger core moves in a direction away from the closer free end of the wiper arm carrier thereby drawing the end 108 and the link 112 in the same direction. This effects a shortening of the distance between the pivotal position of the link 112 to the carrier 104 and the housing 110 of the solenoid actuator. As a result of this, the carrier arm and thus the wiper blade at that end of the wiper blade are caused to move outwards from the windshield thereby providing a clearance between the blade and the windshield such as is shown at either end of the assembly in FIG. 19. At this stage, only the central region of the wiper blade actually touches the windshield. The clearance between each end portion of the wiper arm and the windshield enables loosening of a frozen mass merely trapped beneath the wiper blade at the end portion. A subsequent shattering effect may occur when the solenoid actuators de-energize and the ends of the wiper blade return against the windshield with impact.

In order to improve light transmission through a light transmitting screen member having a frozen mass, i.e. of ice or snow, upon its surface the present invention also includes a method relating to the removal of the frozen mass by applying vibration to the wiper blade. This vibration may be created by any suitable means and in any suitable manner to effect the desired result as disclosed below. The vibrational characteristics must be such as to cause at least parts of the wiper blade to move repeatedly into and out of contact with the surface to be cleaned as measured when no snow or ice is present. The vibrational intensity thus created has the effect when a frozen mass is merely trapped between (i.e. not frozen to) the wiper blade and the surface, of effecting removal of the frozen mass either by release of the mass in one piece or by shattering the mass into smaller pieces under vibrational impact for dispersion.

In other conditions where a frozen mass is adhered to the wiper blade or to the surface to be cleaned, but not both, the vibrational impact may be effective in shattering the mass for its dispersion. Where the frozen mass is adhered both to the wiper blade and to the surface, the vibrational intensity may alternately increase and then reduce wiper blade pressure upon the frozen mass so as to free the blade. This may then be followed by shattering of the frozen mass under continued vibration.

Examples of constructions for applying the required vibrational characteristics for the intended purpose are described in each of the following sixth to eleventh embodiments. In these particular embodiments, as will be seen, a moveable mass is driven for the purpose of creating this vibration by providing a directionally changing inertial load. The mass is driveably moveable independently of movement of the wiper arm. Thus, the driven speed and size of the moveable mass, together with its manner of application and distance from the pivotal axis of the wiper arm and/or the position of the moveable mass when mounted upon the superstructure carrying the wiper blade are all instrumental in deciding the frequency of vibration and other vibrational characteristics of the wiper arm and/or wiper blade. This frequency may also be partly governed by the natural frequency of oscillation and stiffness of the wiper arm and wiper blade assembly and is also largely influenced by the size and design of the assembly and the force of the tension spring which normally urges the wiper blade against the surface to be cleaned, e.g. a windshield. Further, ambient temperature conditions may play a role as they have an influence upon the stiffness of the wiper blade material and also upon the tension spring. It follows that many parameters are involved in producing the desired force to dislodge or shatter a frozen mass merely trapped by the wiper blade or frozen to the wiper assembly, the surface to be cleaned, or both. The speed of movement of the moveable mass and the size of the moveable mass may be such that the resultant frequency and amplitude of vibration of the wiper blade are entirely erratic. Hence, the resultant frequency and amplitude may differ from one vibration to another dependent upon whether the moveable mass is working in sympathy with, or is acting against, the direction of vibration caused in the wiper blade at any instant.

It is clear from studies which have been conducted that the vibrational force produced should not only provide visible vibration to the naked eye of the wiper blade assembly, but, as indicated above, also should cause at least parts of the wiper blade to move repeatedly into and out of contact with the surface of the windshield, as measured, when no ice or snow is present. The vibrational force operating in conjunction with springs of the wiper blade superstructure may, for instance, at specific moments in time, cause the end regions of the wiper blade to move out of contact with the surface to be cleaned in repeated fashion. At other specific moments, lengths of the wiper blade between the end regions may move away from that surface with lengths of the wiper blade towards or at the end regions at that time in contact with the windshield surface. Thus, the vibrational characteristics include the frequency and amplitude of vibration and also differences in the frequency and amplitude dependent upon the location of the moveable mass longitudinally of the wiper blade.

While the term "amplitude" is used in this discussion, the term is used rather loosely in that it is normally used to refer to the extent of swing of a vibrating body on each side of a mean position. However, in constructions in the sixth to eleventh embodiments, there is no mean position as the wiper blade is forced by the tension spring on the wiper arm against the surface to be cleaned thereby deadening or damping out "amplitude" in its normal sense. The term "amplitude" is thus used in this specification to refer to the extent of lateral movement of the wiper blade over the dampening effect of the tension spring.

From the above, it follows that with regard to the employment of vibrational movement, under the instrumentation of a driven moveable mass, the invention as exemplified in the sixth to eleventh embodiments, is basically concerned with the removal of a frozen mass which is merely trapped between the wiper blade and the surface to be cleaned by the generation of vibrations having characteristics which, in combination with the momentum of the moveable mass, produces sufficient vibrational force to either release the frozen mass as a single piece or to shatter the frozen mass. It is in this realization that the inventive concept is particularized in these embodiments.

Figure 20:
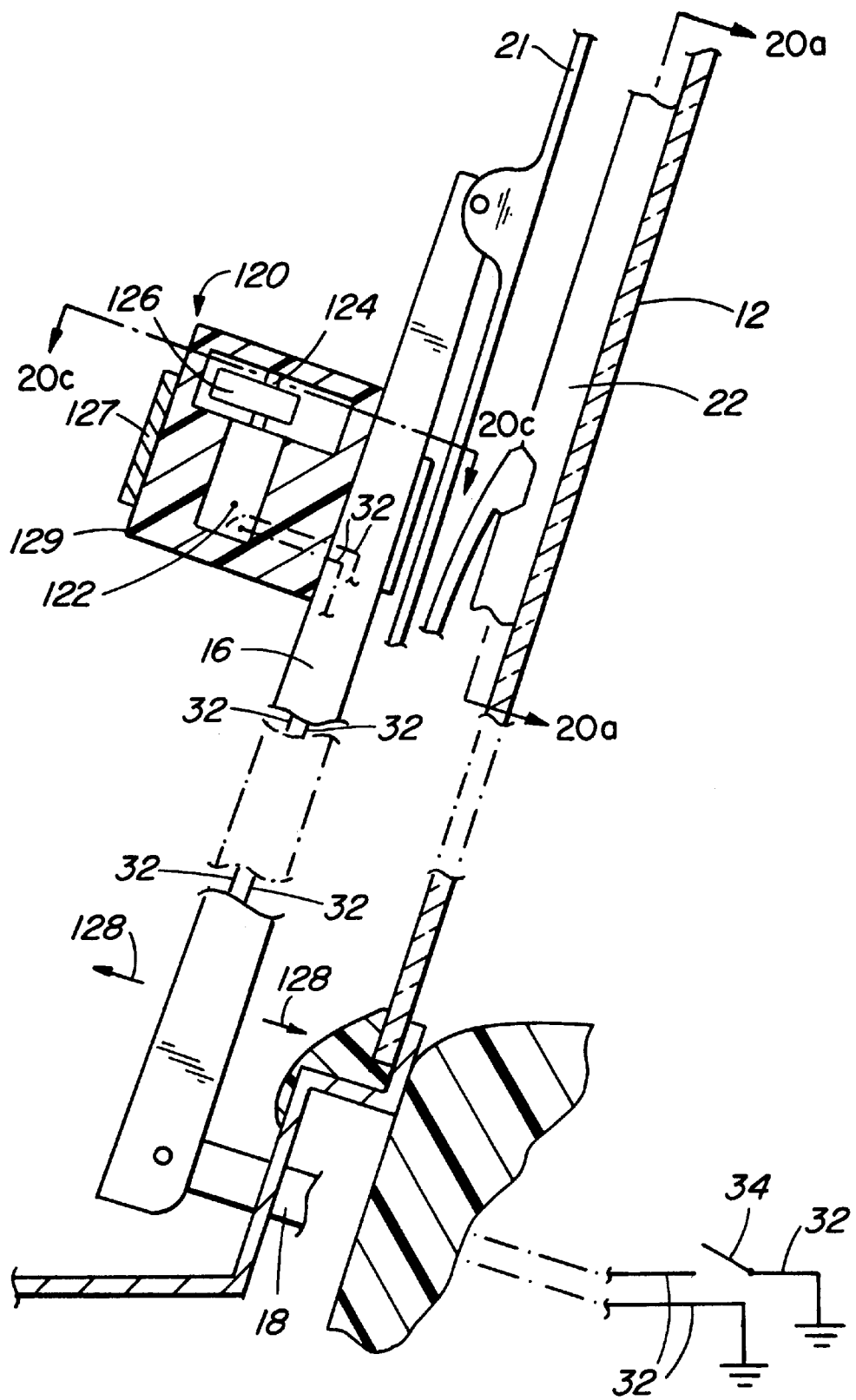
FIG. 20 is a view similar to FIG. 4, but to larger scale, and shows part of a windshield wiper assembly according to a sixth embodiment.

In a sixth embodiment as shown in FIG. 20, a vibration generating means 120 is provided for imparting a vibrational movement to the wiper arm 16 and thus to the wiper blade 22 during a sweeping action of the wiper arm or in a stationary position. The means 120 comprises a DC electric motor 122 which is positioned on the side of the wiper arm remote from the blade and close to the pivot position of the wiper blade. The driven shaft 124 of the motor carries a moveable mass 126 which is eccentrically carried in relation to the rotational axis of the motor. The motor 122 is rigidly held within a surrounding environmentally protective casing 129 of rubber or plastic and which also surrounds the moveable mass 126 while providing clearance to allow for eccentric rotation of the moveable mass. Surrounding the casing and the arm 16 is a strong metal strap 127 to secure the casing and the means 120 in position.

Figure 20A:
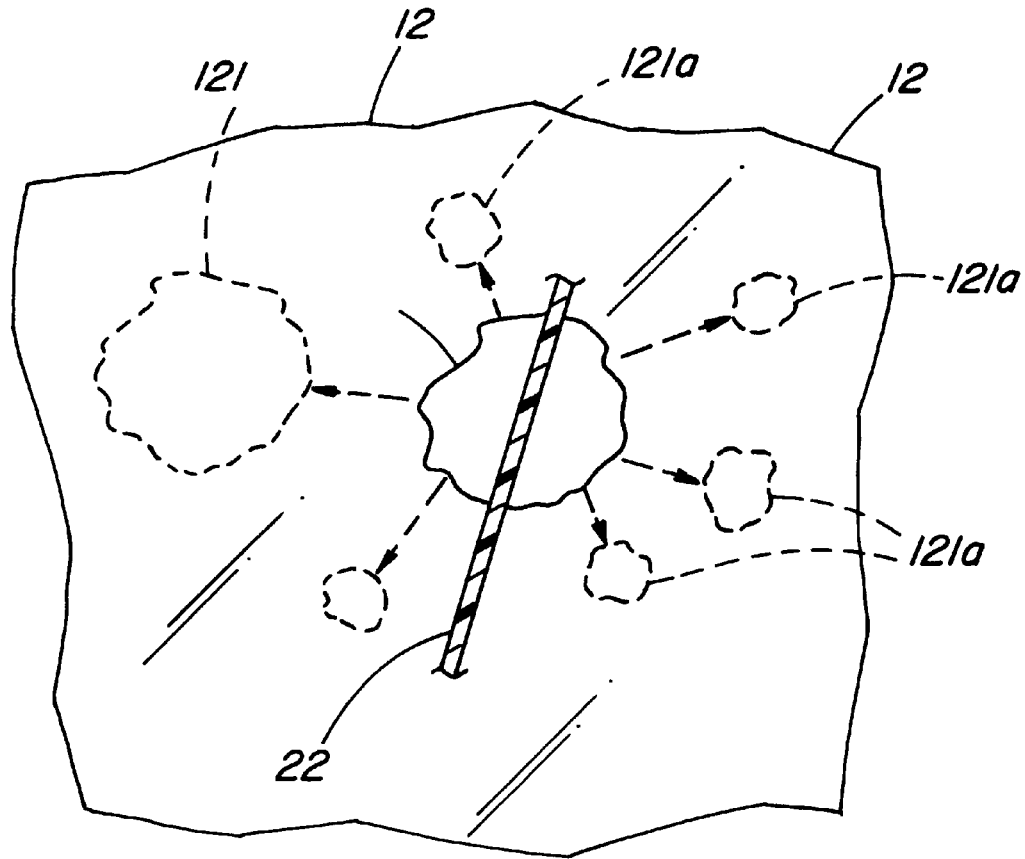
FIG. 20a is a cross-sectional view taken along line 20a—20a in FIG. 20.

The moveable mass 126 is offset in such a way as to cause the wiper arm 16 to vibrate in a direction towards and away from the windshield 12, as shown by the arrows 128, when the motor 122 is energized by the driver by operation of switch 34 within the vehicle. Thus, the switch 34 has a non-energizing mode when the switch is not operated (i.e. in open position as shown in FIG. 20), and an energizing mode with the switch operated (i.e. closed). With the switch in the energizing mode, for a desired time period to effect the required result, the motor 122 is continuously operated to impart vibrational movement to the wiper arm. As vibrational movement occurs during oscillation of the wiper arm, any frozen mass, (e.g. frozen mass 121 as shown in FIG. 20a) merely trapped beneath and moving with the wiper blade, i.e. not adhered either to the blade or to the windshield, is removed. This removal is caused by the release of the frozen mass as a single piece (shown being released in chaindotted in FIG. 20a) or by the mass being shattered (to cause its dispersion in small pieces 121a) under the impact force of the wiper blade now to be discussed. The momentum of the eccentrically rotating mass 126 in combination with the vibrational characteristics of the wiper arm and blade assembly produces a vigorous vibrational force which deflects and deforms the wiper blade sufficiently to raise parts of the blade so that the blade repeatedly moves into and out of contact with the frozen mass. This repeated movement causes repeated applications of impact force against the frozen mass to effect shattering of the frozen mass where this cannot be released as a single piece. It is found that frozen masses which are merely trapped are dispersed within a few seconds, e.g. 1 to 10 seconds.

The vibrational intensity required must be sufficient to cause at least parts of the wiper blade to move away from and towards the windshield as measured when no frozen mass is present. Such shattering is also assisted by a flexing of the wiper blade during its vibrational movement. The blade may flex so that in some flexed positions, end parts of the blade move out of contact with the windshield while other parts remain in contact therewith. In other flexed positions, the end parts remain in contact with the windshield while other parts are flexed outwards away from it. This is illustrated diagrammatically in FIG. 20b wherein the windshield engaging edge of the wiper blade 22 is shown in one flexed position 23a with end parts raised away from the windshield as shown by arrows at the blade ends and in another flexed position 23b with more central parts away from the windshield (arrows in blade center). In the latter position the end parts are in contact with the windshield. In FIG. 20b, other parts of the wiper assembly are omitted for clarity.

The rotational speed of the motor together with the size and eccentric positioning of the moveable mass 126 from the pivotal axis of the wiper arm all contribute to the effect of the vibrational motion. The vibrational characteristics are determined by the design and size of the wiper arm and blade assembly and the natural vibrational frequency thereof together with the strength of the tension spring and the force with which the tension spring urges the wiper blade against the windshield. Hence, these characteristics differ from one design to another. In this embodiment it has been discovered that the means 120 is particularly effective. In the embodiment, the electric motor is one made by Sanco Electrical Company and is a 12 volt DC motor having the code number M8M12M24 and operable, in this embodiment, up to or around 13,500 rpm. In alternatives, electric motors made by Mabuchi Motor Corp., have been used. These motors having code numbers FK-260SA-12300 (operating at 7500 rpm) and FK180SH-14180 (operating at 9500 rpm) have been found to be effective and allow for a smaller total structure of vibration generating means than in the embodiment. In the embodiment and in these alternative, the driven shaft of the motor is secured by solder to the moveable mass 126 which is approximately 45 grams, made from lead and is circular with a diameter of 1¼ inches (see FIG. 20c). The axis of the motor lies 3/16 of an inch from an edge of the mass.

The wiper blade has a length of 16.5 inches and the mounting axis of the blade is 14.75 inches along the wiper arm from the pivotal axis of the arm, i.e. at shaft 18. The moveable mass 126 operates effectively at a distance of 3.5 inches approximately along the wiper arm towards the shaft 18, i.e. away from the mounting axis of the blade to the wiper arm. For guidance, with the moveable mass 126 effective at this position, a force of between 2 and 3 pounds is necessary, with the wiper assembly inoperative so as to raise the wiper blade 0.5 inches approximately away from the windshield surface. However, such a distance is not required in performance of the invention as lesser distances of movement away from the windshield will achieve the desired objective, e.g. about 0.0625 inches or slightly greater. If distances progressively closer to the shaft 18 are chosen for positioning the means 120, vibration of the assembly becomes less pronounced and progressively larger moveable masses may become necessary to achieve the inventive effect.

In the embodiment, the rotational axis of the motor and moveable mass is parallel to the longitudinal axis of the wiper arm as shown. However, the motor and moveable mass may be oriented at a different angle to the longitudinal axis and produce a similar effect. It has also been found that an eccentric mass of 30 grams has had a similar effect, but has required slightly longer to remove a frozen mass merely trapped beneath the wiper blade, but not frozen to the blade nor to the windshield. It is also found that moveable masses less than 30 grams showed a decreasing ice or snow removal effect. With this particular structure and with a moveable mass 126 below 15 grams in the means 120, it is found that there is no effect upon removal of a frozen mass merely trapped beneath the wiper blade or frozen to it. It is possible that such a small moveable mass may achieve the desired effect upon smaller wiper systems, e.g. headlight wiper systems, or upon different designs of vibration generating means. However, in the construction with the small mass, the wiper blade does not move away from the windshield at any position along its length when no ice or snow is trapped beneath the blade; this construction does not fall within the inventive concept.

In a first modification of the sixth embodiment, a moveable mass 130, as shown in FIG. 21 has been used instead of the moveable mass 126. The moveable mass 130 has a weight of 45 grams and has a substantially crescent shaped main portion 132 mounted by an integral radial arm 133 to the driven shaft 124 of the motor 122. The part of the structure with most of the moveable mass, i.e. the main portion 132, located to one side of the axis of rotation about shaft 124 places the center of gravity of the moveable mass at a substantially greater distance from the axis than is found with the moveable mass 126. This positioning of the center of gravity effectively increases the vibrational force beyond that possible with moveable mass 126 although both moveable masses are of substantially equal weights. The moveable mass 130 has a smaller radius, thus allowing for smaller commercial packaging.

In the sixth embodiment and in the first modification thereof, the vibrational force is sufficiently vigorous to flex parts of the wiper blade into and out of contact with the windshield when no ice or snow is present. This effectively produces the desired result when frozen masses are merely trapped beneath and possibly moving with the wiper blade, the vibration causing the wiper blade to move into and out of contact with the trapped frozen mass. Where a frozen mass is adhered to the wiper blade, it is raised by the wiper blade and then returned under impact force against the windshield to cause shattering of the frozen mass. Also, when a frozen mass is frozen to the windshield, the recurring impact force of the vibrating wiper blade may shatter it. In contrast, as referred to above, it has been found in tests that when lesser masses have been employed in vibration generating means to provide less vibrational force, i.e. no part of the wiper blade has been raised from the windshield, then over an unacceptable time period of several minutes, masses of ice or snow, when trapped, have not been released from beneath the wiper blade or shattered.

In a second modification of the sixth embodiment (not shown), the overall diameter or width of the vibration generating means may be reduced by providing the moveable mass in two portions instead of one. In the second modification, the two portions of the moveable mass are disposed axially spaced apart with the D.C. driving motor located between them. The driven shaft of the motor extends from both ends of the motor and the two portions of the mass are secured one to each end of the driven shaft.

In addition, in the sixth embodiment, vibrational movement may sometimes be effective in removing a frozen mass accumulated upon and around the wiper assembly when this is in the parked, i.e. non-use position, alongside or below a bottom edge of the windshield. The vibrational movement may also be effective to remove a frozen mass, frozen both to the wiper assembly and to the windshield. In both of these cases the vibrational intensity causes the wiper blade to reduce and increase pressure upon the frozen mass which may cause its cracking and subsequent shattering.

The invention also includes the use, in a wiper assembly, of more than a single means for imparting vibrational movement to the wiper arm.

Figure 22:
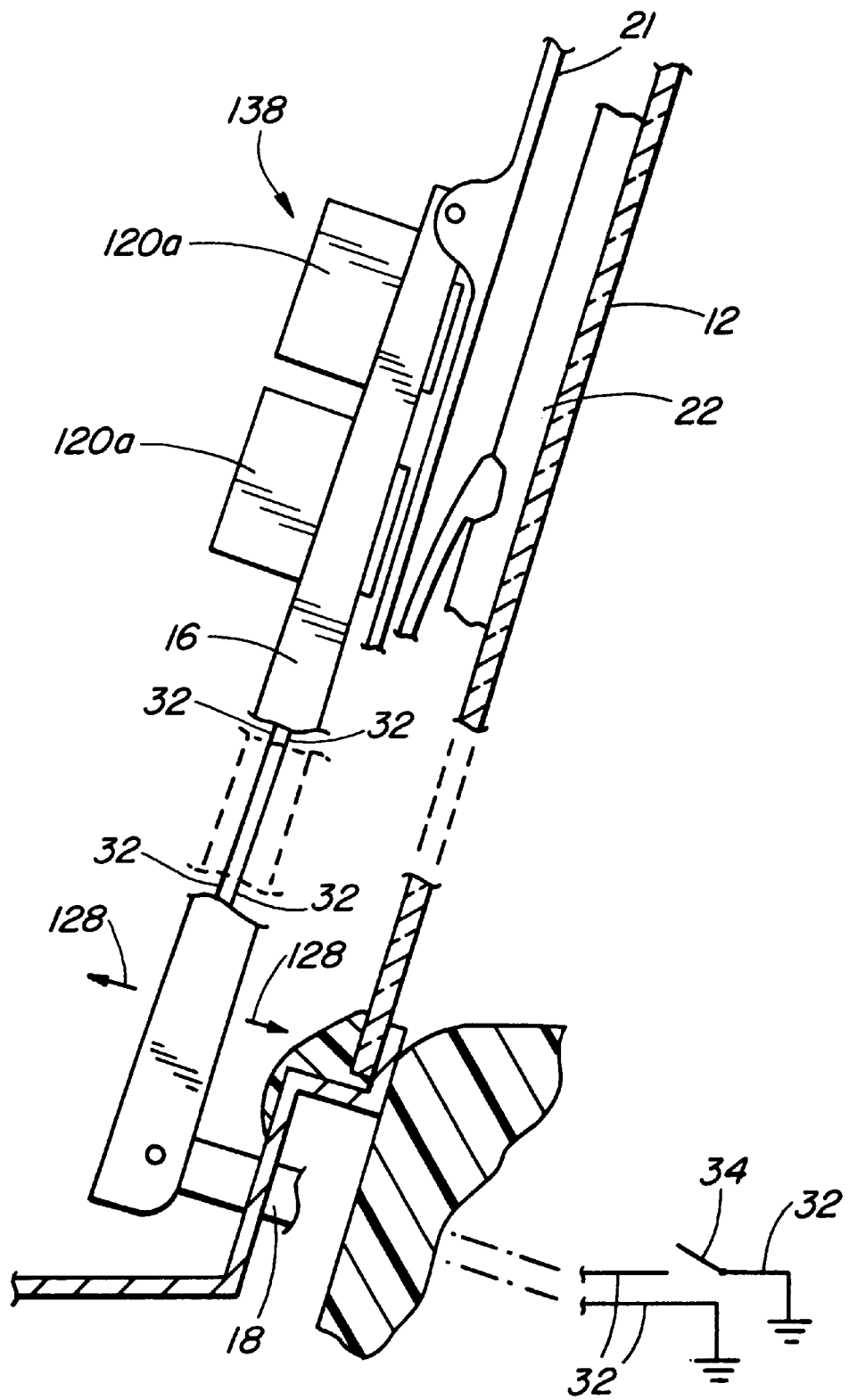
FIG. 22 is a side elevational view of a wiper assembly according to a seventh embodiment.

For instance, in a seventh embodiment, as shown in FIG. 22, a windshield wiper assembly 138 which is otherwise similar to the sixth embodiment, incorporates two vibration generating means 120a instead of a single means 120 as in the sixth embodiment. Each means 120a is of similar construction and operation to the means 120 and has a D.C. electric motor (not shown) driveably connected to an offset mass for providing vibration when driven by the motor. In the seventh embodiment, the two means 120a are positioned in tandem along the wiper arm 16 with their D.C. electric motors substantially axially aligned. It is envisaged that one or both of the means 120a may, if desired, be in different positions of orientation both on the arm and relative to each other. Thus, the positions of the means 120a may be set as desired to provide required vibrational characteristics to the wiper arm 16 and thus to the wiper blade 22 so as thereby to operate most effectively in causing removal of any frozen mass merely trapped beneath the wiper blade. The vibrational characteristics of the wiper arm and wiper blade may thus be chosen, as influenced by the operation of the two means 120a and the positions of these means upon the wiper arm. In addition, it is envisaged that if the means 120a are dissimilar in certain ways, this will also provide for continuous changes in vibration characteristics. Such dissimilarities include the offset masses of the two means 120a being of different weights and/or having different effective offset positions from the axes of rotation of their respective motors so that the combined vibrational force applied by these offset masses varies on a continuous basis. This combined vibrational force is also caused to change where one of the D.C. electric motors rotates at a different angular speed from the other or where the speed of one or both motors is controllable by a vehicle occupant during use of the means 120a.

A further advantage with the use of two means 120a is that each of these means may be of smaller size than the means 120 of the sixth embodiment while providing required vibrational characteristics for the intended purpose. Hence, each of the means 120a will be rendered less visually obtrusive to vehicle occupants than the means 120.

Figure 23:
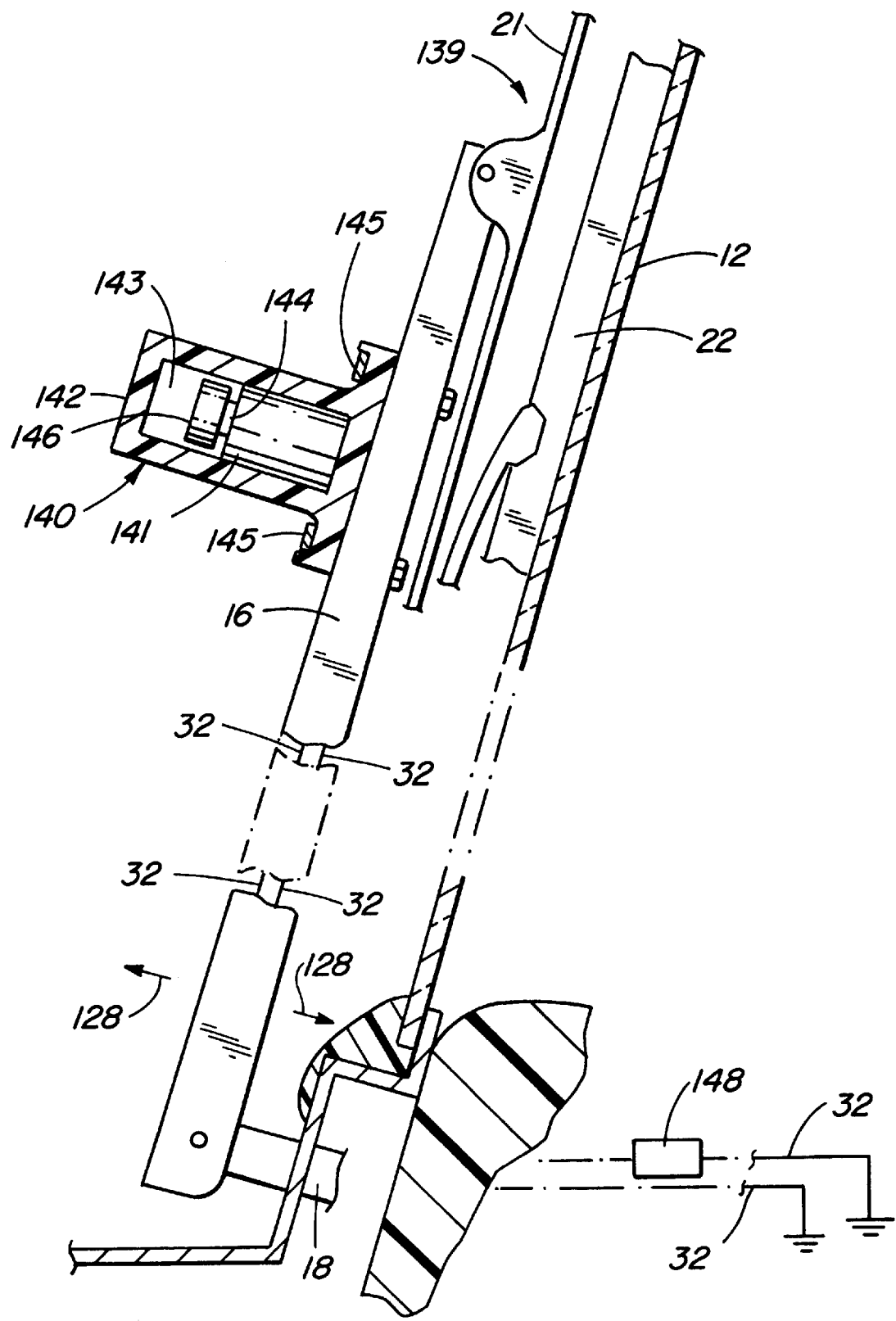
FIG. 23 is a view similar to FIG. 20 of an eighth embodiment.

In an eighth embodiment as shown in FIG. 23, a windshield wiper assembly 139 which is otherwise similar to the sixth embodiment has instead of a vibration generating means with an eccentrically driven moveable mass, a vibration generating means 140 having a reciprocally driven moveable mass. In the eighth embodiment this vibration generating means comprises a solenoid actuator 141 mounted upon the wiper arm with the axis of the solenoid actuator extending substantially normal to the longitudinal direction of the arm 16. The solenoid actuator is mounted within a protective molded surround 142 which has an inside space 143 to allow for axial movement of the plunger core 144 of the solenoid actuator within the surround. The plunger core forms part of the moveable mass. The surround 142 is secured to the arm 16 by two spaced metal straps 145. The plunger core is springloaded in one direction and actuation of the actuator causes movement of the core into the space 143. The moveable mass is such that upon being actuated intermittently at short spaced intervals, the wiper assembly 138 is caused to vibrate towards and away from the windshield. The moveable mass, which may need to include a head weight 146 at one end of the core, is sufficient for its momentum in conjunction with the vibrational characteristics of the wiper arm and blade to produce a sufficiently vigorous vibration of the assembly 138 as to raise parts of the wiper blade from the surface of the windshield as in the sixth embodiment, i.e. when ice or snow is not trapped beneath the blade. The total moveable mass of core and head weight may be less than is required in the sixth embodiment, because all of the moveable mass is acting at any particular moment in one direction and is not at least partly counterbalanced by part of the moveable mass acting in the opposite direction as with a rotational moveable mass. This satisfactorily results in removal, i.e. by total release or shattering of frozen masses when merely trapped beneath the wiper blade and may result in shattering frozen masses adhered to the wiper assembly, the windshield, or both. The vibration generating means also includes a driver operated on/off electronic or electrical switch 148 as shown diagrammatically in FIG. 23, the switch, when in an energizing mode, operating a pulsing circuit. This switch actuates the solenoid actuator in pulsing fashion by the electronic pulsing circuit to produce a required reciprocating movement of the plunger core which causes the desired vibration of the wiper arm assembly.

In a modification of the eighth embodiment (not shown), the vibration generating means 140 is replaced by two vibration generating means of similar construction to the means 140. Advantages in use of this modification are similar in use to those of the seventh embodiment discussed above including continuously changing the vibrational characteristics produced by the vibration generating means and the fact that each of these means may be smaller in size than the vibration generating means 140. The two vibration generating means may be positioned side by side or in any other desirable positions to provide continuously changing vibrational characteristics and their moveable masses may be of different sizes and/or each of the means may have different cyclic reciprocating speeds. As an example, variable EMF may be employed to provide such reciprocating speeds.

Vibration generating means according to the invention need not be necessarily provided by structures to be mounted upon a wiper arm to provide a desired vibrational effect to remove frozen masses. As already indicated, the essence of the invention is concerned with providing a vibration having vibrational characteristics of the wiper blade to provide sufficient force or intensity to cause at least parts of the wiper blade to move repeatedly into and out of contact with the surface of the windshield, as measured when no ice or snow is present. Any suitable vibration generating means to produce this result will achieve the desired objective so long as it is operably connected to the wiper blade. This is further exemplified by the ninth to eleventh embodiments to follow.

Figure 24:
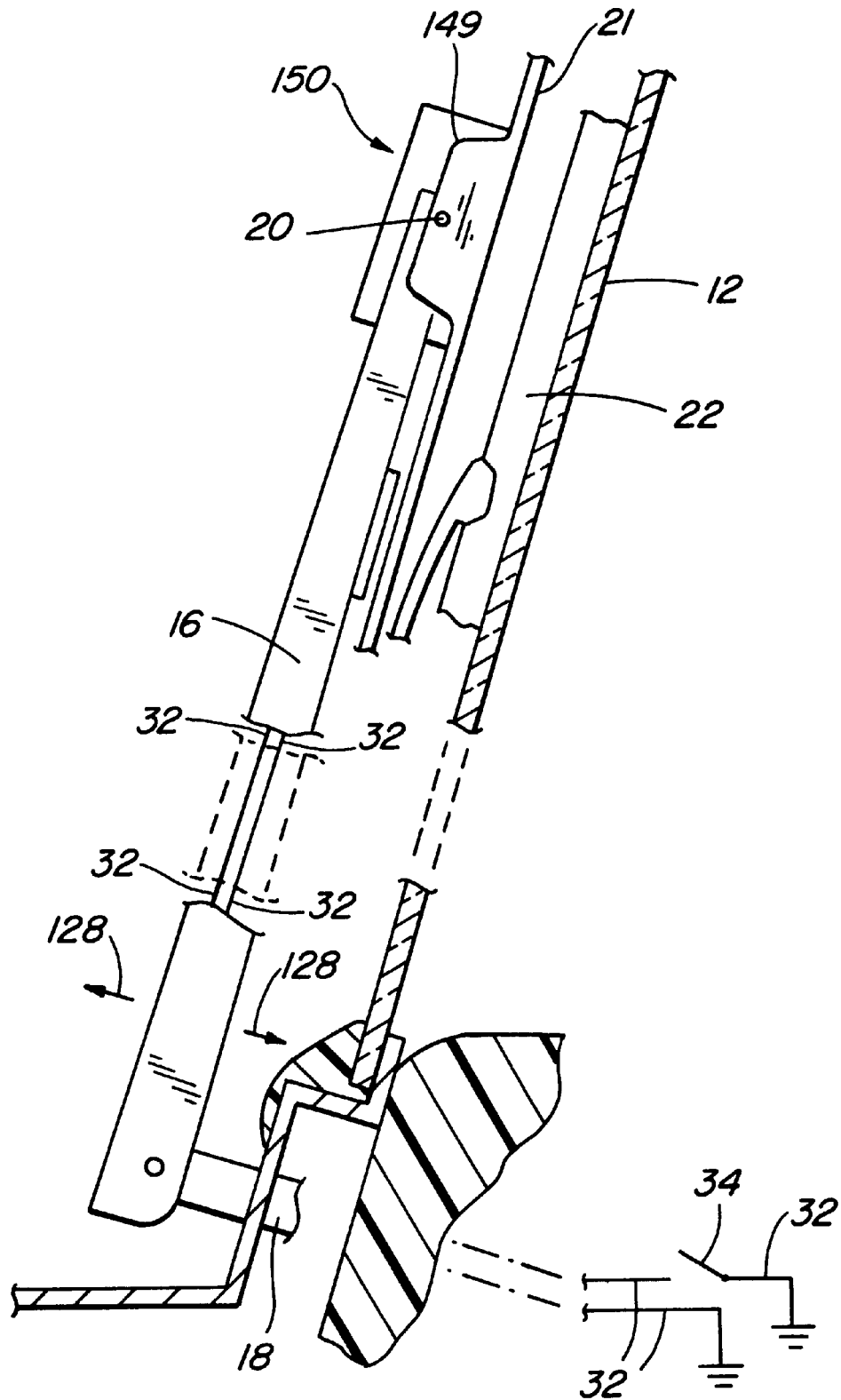
FIGS. 24 and 25 are views similar to FIG. 22 of a ninth and tenth embodiment.

In a ninth embodiment (FIG. 24) a vibration generating means 150 which is, for instance, of the structure of either the vibration generating means 120 or the vibration generating means 140 discussed above, is mounted upon the superstructure 21 of the wiper blade. The superstructure is mounted by the mounting pin 20 to the wiper arm. The vibration generating means 150 is mounted to a central region 149 of the superstructure.

Figure 25:
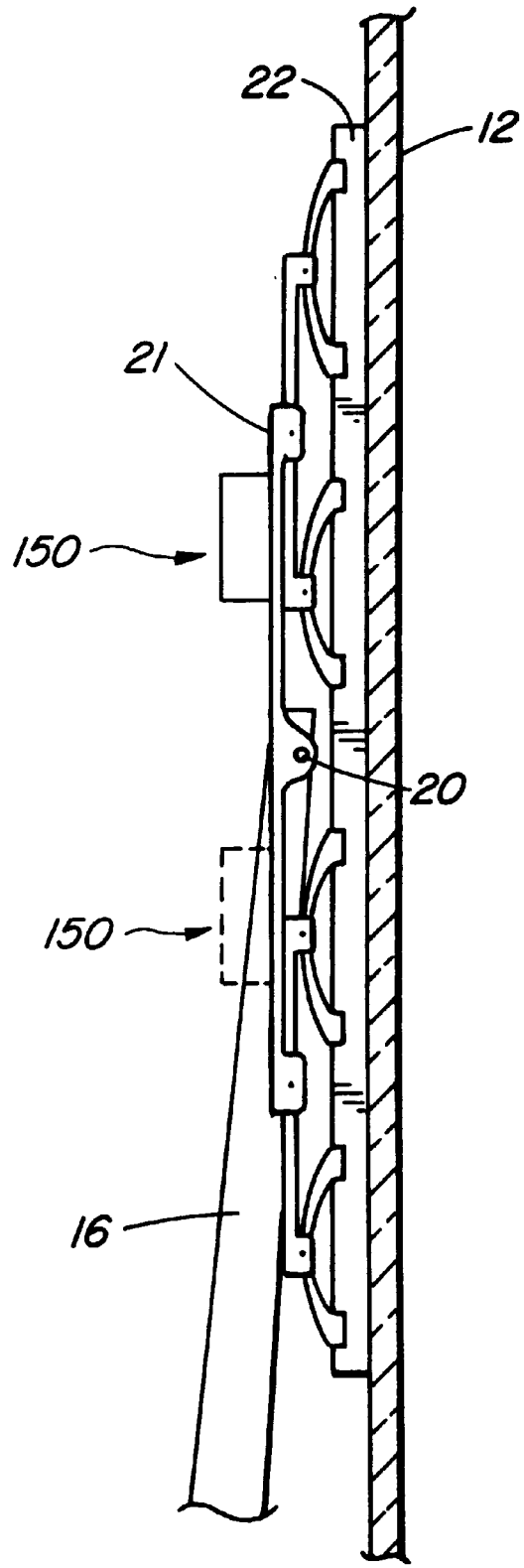

In a tenth embodiment (FIG. 25) a vibration generating means 150 is mounted at any desirable position along the superstructure 21 to provide required vibrational characteristics for removal of ice or snow located beneath and travelling with the wiper blade. If required, at least one other vibration generating means 150 (shown in chaindot) is also mounted upon the superstructure and the multiple vibration generating means are placed at strategic positions to provide the desired vibrational characteristics.

It is envisaged that with one or more vibration generating means 150 mounted upon the superstructure, the size of the or each means may have smaller moveable masses than in previous embodiments to provide desired vibrational characteristics. This is because the or each means is operating more directly upon part of the wiper blade without having to apply vibrational force indirectly through the medium of the wiper arm. The use of two or more vibration generating means 150 also offers similar advantages to those discussed above in previous embodiments when using two vibration generating means.

Figure 26:
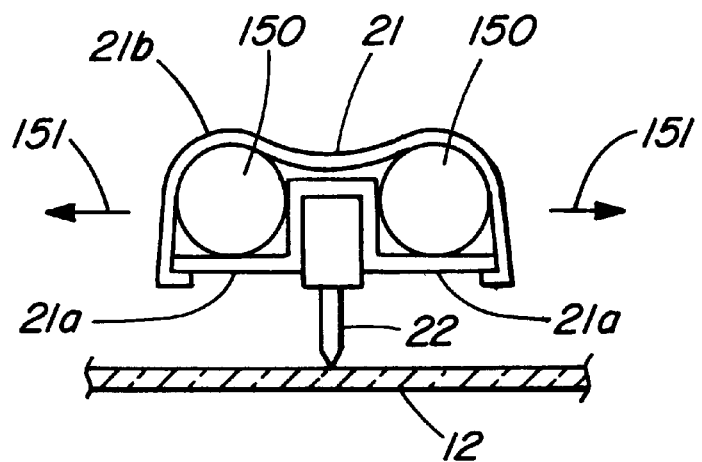
FIG. 26 is a cross-sectional view through a windshield and showing an end view of part of a wiper assembly according to an eleventh embodiment.

In an eleventh embodiment (FIG. 26) two vibration generating means 150 are disposed one on each side of the superstructure 21 and are secured upon outward flanges 21*a* of the superstructure by a holding bracket 21*b*. As with previous embodiments, using two vibration generating means, these may be smaller than in embodiments using only one. The positioning of the means 150, the relative sizes of their moveable masses and cyclic speeds of operation affect their vibrational characteristics. By control of these variables, not only are vibrational movements of the wiper blade caused towards and away from the windshield 12, but also vibrational movements may be caused in directions having a component parallel to the windshield plane, as shown by arrows 151.

Figure 27:
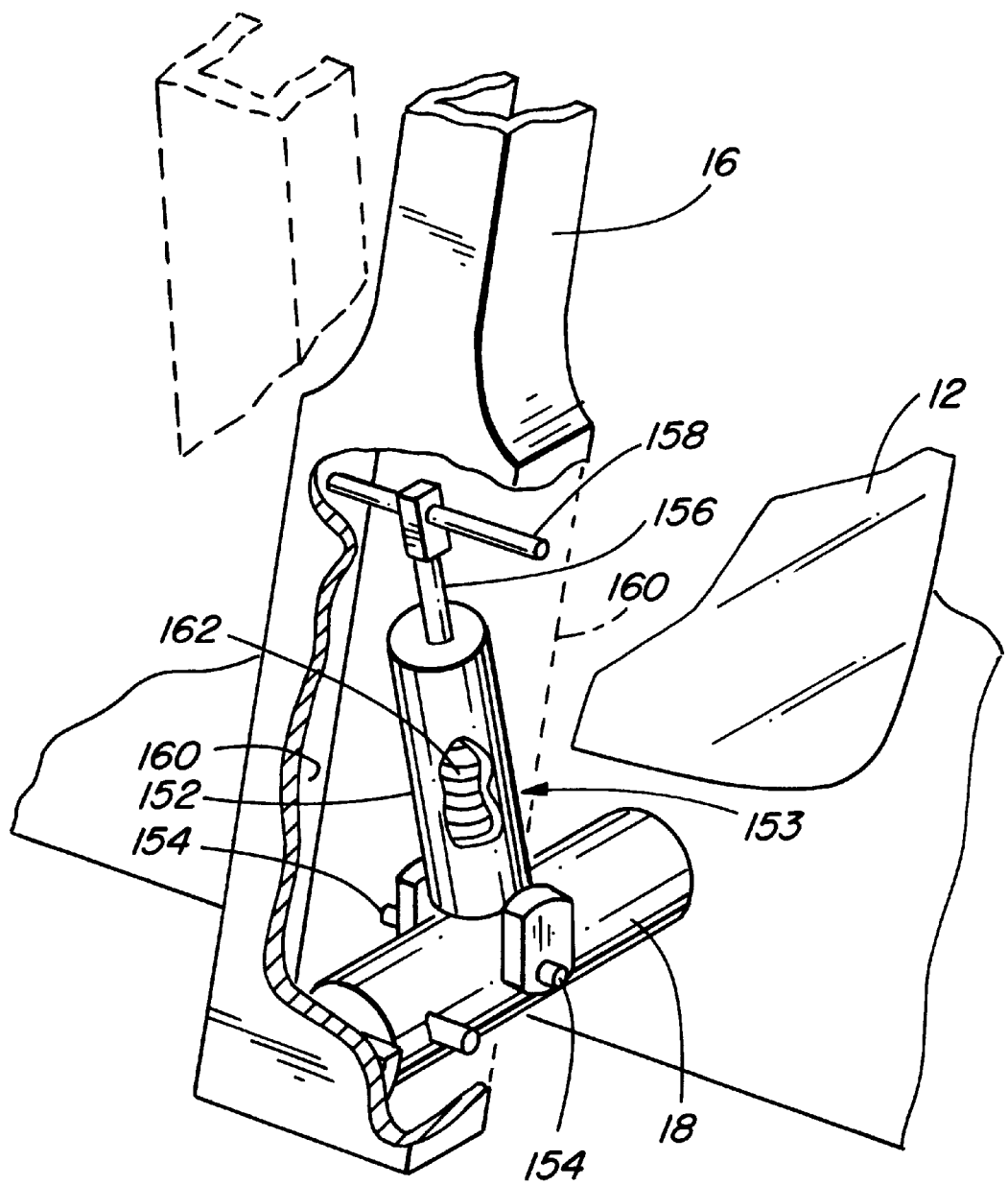
FIG. 27 is an isometric view partly in cross-section showing a combination of wiper assembly and windshield according to a twelfth embodiment.

In a twelfth embodiment as shown in FIG. 27, as in previous embodiments the wiper arm 16 is carried upon the shaft 18 for oscillating movement. In this embodiment the means for moving the wiper arm and thus the blade away from the windshield comprises a solenoid actuator 153 which is operably mounted to apply a force between the shaft 18 and the arm 16. Thus one end of the actuator is attached either to the shaft 18 or a sleeve (not shown) surrounding it and the other end is attached to the arm. In this particular embodiment, the cylindrical housing 152 of the actuator is pivotally mounted in trunnions 154 to the shaft 18 and at the other end, the plunger core 156 is pivotally connected by a pivotal cross-shaft 158 mounted in sides 160 of the wiper arm 16. In this structure the means for urging the wiper arm towards the windshield is provided by a return compression spring 162 within the housing 152. Thus, with the actuator de-energized the spring is in an expanded condition to hold the wiper arm towards the windshield for normal wiping operation and as shown in full outline in FIG. 27. To remove a frozen mass merely trapped beneath the wiper blade, the solenoid is energized against the spring so that the plunger core moves upwards and forces the wiper arm 16 to pivot outwardly and away from the windshield to space the wiper blade therefrom. This latter position is shown in chaindotted in FIG. 27 and corresponds to the chaindotted position in FIG. 2.

In a thirteenth embodiment, shown in FIGS. 28 and 29, in a vehicle a compressed air dispensing tube 170 extends along the wiper arm 16 with the tube having two outlet ends 172, one on each side of the wiper blade 22, and in close proximity to and directed at the windshield 12. The tube is connected to a compressed air storage 174 within which air is held at a desired pressure by means of an air compressor 176 driven by the vehicle engine (not shown). Air under compression is maintained within the storage 174 for immediate use after start up of the vehicle or, if required, before start up.

In use, the compressed air is controlled to issue from the outlets 172 in intermittent bursts timed fractionally apart. This intermittent control is performed by a suitable automatically operated quick action on/off valve 178, operated electrically. The intermittent bursts of compressed air are at sufficiently high pressure to act directly upon the windshield to urge the wiper blade (at least in the immediate region of air application) away from the windshield when no ice or snow is present. The lift capacity of the air upon the wiper blade is dependent upon the position of the outlets 172 longitudinally of the wiper blade. The load placed upon the windshield by the air pressure may need to be between 2 pounds and 15 pounds dependent upon outlet position. Upon termination of each burst, the wiper blade is returned to the windshield surface under the force of the tension spring which normally forces the blade against that surface. It follows that the intermittent applications of compressed air to the windshield in this manner results in movement of the adjacent regions of the wiper blade rapidly into and out of contact with the windshield surface. This rapid movement is akin to vibration and may indeed set up vibration in the wiper blade at least in some regions along the blade and this may result in the wiper blade moving into and out of contact with the windshield also in these regions. Thus, in order to remove a frozen mass merely trapped beneath the wiper blade in at least the region immediate to the outlets 172, the application of intermittent bursts of compressed air will cause movement of at least that region so as to reduce and then increase the pressure alternately of the wiper blade upon the frozen mass so as to shatter the mass. If the application of the compressed air is sufficiently effective, the wiper blade may be caused intermittently to move out of contact with the frozen mass thereby allowing it to move freely away as a single piece.

In the thirteenth embodiment, the compressed air may be heated as it moves along the dispensing tube 170, e.g. by location of the tube within a heat exchanger which extracts heat from the vehicle engine. The heated compressed air should dispel any accumulations of ice or snow at the outlet ends 172. Alternatively, an electric heater may be placed at the outlet ends 172 to dispel such accumulations of ice or snow before pressurized air is delivered through the tube.

In modifications of the thirteenth embodiment (not shown) a plurality of tube outlet ends 172 are disposed at predetermined positions along the wiper blade. Compressed air may be controlled to issue from chosen outlet ends, all of the ends simultaneously, or in some chosen sequence to cause flexing of the wiper blade and movement towards and away from the windshield in a most desirable manner, for removal of a frozen mass when this is merely trapped.

In a further modification (not shown) the compressor 176 acts directly to supply compressed air to the tube 170 for its immediate intermittent application to the windshield, the compressed air storage 174 being omitted.

For those embodiments which can raise the wiper arm away from the windshield at any point during wiper arm travel (e.g. second, fourth and twelfth embodiments), it may be advantageous to provide a switch disabling means capable of disabling the lifting action while the wiper assembly is parked. This may be especially advantageous on those vehicles which effectively hide the wiper assembly in the parked position, e.g. under a cowl assembly. The switch disabling means may comprise, for example, a mercury switch arrangement disposed on the wiper arm and electrically connected to disable the actuators to prevent energization in the parked position. The switch disabling means may also comprise a switch which is enabled or disabled dependent on the rotational position of the drivable mounting.

It is envisaged that the invention in any of its various embodiments may be sold in kit form. The kit would comprise replacement arms with or without wiper blades and would include, for example, the solenoid actuators, and vibration generating means together with any hardware required for mounting to a vehicle.

The embodiments of the invention in which an exclusive right or privilege is claimed are defined as follows:

1. A method of improving transmission of light through a light transmitting screen member having a frozen mass merely trapped between the screen member and a wiper blade which is moveable across the screen member, the method comprising:

repeatedly vibrationally flexing the wiper blade to move different parts of the wiper blade, out of phase with one another, out of and into contact with the screen member, the strength of repetitive vibrational flexing:

a) achieving an intensity of movement of the different parts of the wiper blade out of and into contact with the screen member to create recurrent impact forces, in an out-of-phase manner, upon different parts of the screen member; and b) effecting removal of the frozen mass under the influence of the recurrent impact forces.

2. A method according to claim 1 comprising maintaining continuous contact of the wiper blade with the screen member during vibration.

3. A method according to claim 2 comprising causing end regions of the wiper blade to be vibrated repeatedly out of and into contact with the screen member.

4. A method according to claim 2 comprising causing end regions of the wiper blade and regions of the wiper blade spaced from the end regions to be repeatedly vibrated out of and into contact with the screen member, the regions spaced from the end regions vibrating out of phase with the end regions.

5. A method according to claim 1 comprising applying a directionally changing inertial load to a wiper arm which carries the wiper blade to cause the wiper arm to vibrate.

6. A method according to claim 1 comprising vibrating the wiper blade by directing intermittent bursts of pressurized air against the screen member to cause the wiper blade to vibrate.

7. A method of improving transmission of light through a light transmitting screen member having a frozen mass merely trapped between the screen member and a wiper blade which is moveable across the screen member, the method comprising:

generating a vibrational force and, simultaneously with the generation of the vibrational force, applying the vibrational force to the wiper blade;

under the urgency of the vibrational force, repeatedly vibrationally flexing the wiper blade to move different parts of the wiper blade, out of phase with one another, out of and into contact with the screen member, the strength of repetitive vibrational flexing:

a) achieving an intensity of movement of the different parts of the wiper blade out of and into contact with the screen member to create recurrent impact forces, in an out-of-phase manner, upon different parts of the screen member; and b) effecting removal of the frozen mass from the screen member under the recurrent vibrational impact forces.

8. A method according to claim 7 comprising maintaining continuous contact of the wiper blade with the screen member during vibration.

9. A method according to claim 8 comprising causing end regions of the wiper blade to be repeatedly vibrated out of and into contact with the screen member.

10. A method according to claim 8 comprising causing end regions of the wiper blade and regions of the wiper blade spaced from the end regions to be repeatedly vibrated out of and into contact with the screen member, the regions spaced from the end regions vibrating out of phase with the end regions.

11. A method according to claim 7 comprising applying a directionally changing inertial load to a wiper arm which carries the wiper blade to cause the wiper arm to vibrate.

12. A method according to claim 7 comprising vibrating the wiper blade by directing intermittent bursts of pressurized air against the screen member to cause the wiper blade to vibrate.

13. A method according to claim 7 comprising applying the vibrational force to the wiper blade independently of movement of the wiper blade across the screen member.

* * * * *

UNITED STATES PATENT AND TRADEMARK OFFICE
CERTIFICATE OF CORRECTION

PATENT NO.  : 6,129,093
DATED       : October 10, 2000
INVENTOR(S) : Michael J. Kelly It is certified that error appears in the above-indentified patent and that said Letters Patent is hereby corrected as shown below:

Col. 1, line 4:    Delete "wiper assemblies" and substitute --wipers and their method of use--

Col. 10, line 32:  Delete "wiper arm carrier 104" and substitute --superstructure 21--

Col. 10, line 42:  Delete "wiper arm carrier" and substitute --superstructure 21--

Col. 10, line 45:  Delete "carrier 104" and substitute --superstructure 21--

Col. 10, line 46:  Delete "carrier arm" and substitute --superstructure 21--

Col. 19, line 32:  After "member" insert --and upon the frozen mass--

Col. 20, line 23:  After "member" insert --and upon the frozen mass--

Signed and Sealed this

Eighth Day of May, 2001

Attest:

NICHOLAS P. GODICI

Attesting Officer

Acting Director of the United States Patent and Trademark Office